June 8, 1954 G. A. WAHLMARK 2,680,348
ROTARY PUMP AND MOTOR HYDRAULIC TRANSMISSION
Filed May 20, 1950 14 Sheets-Sheet 5

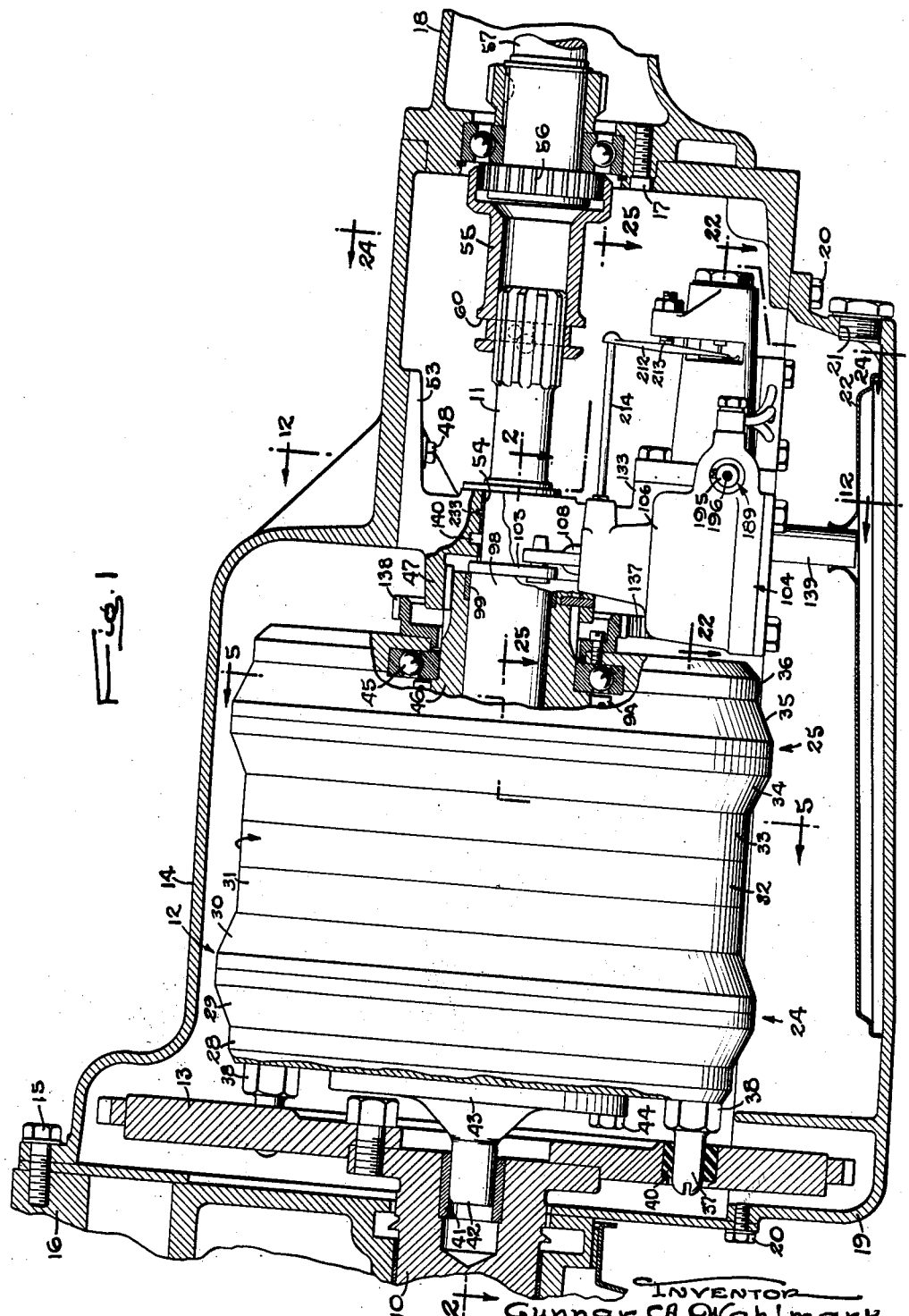

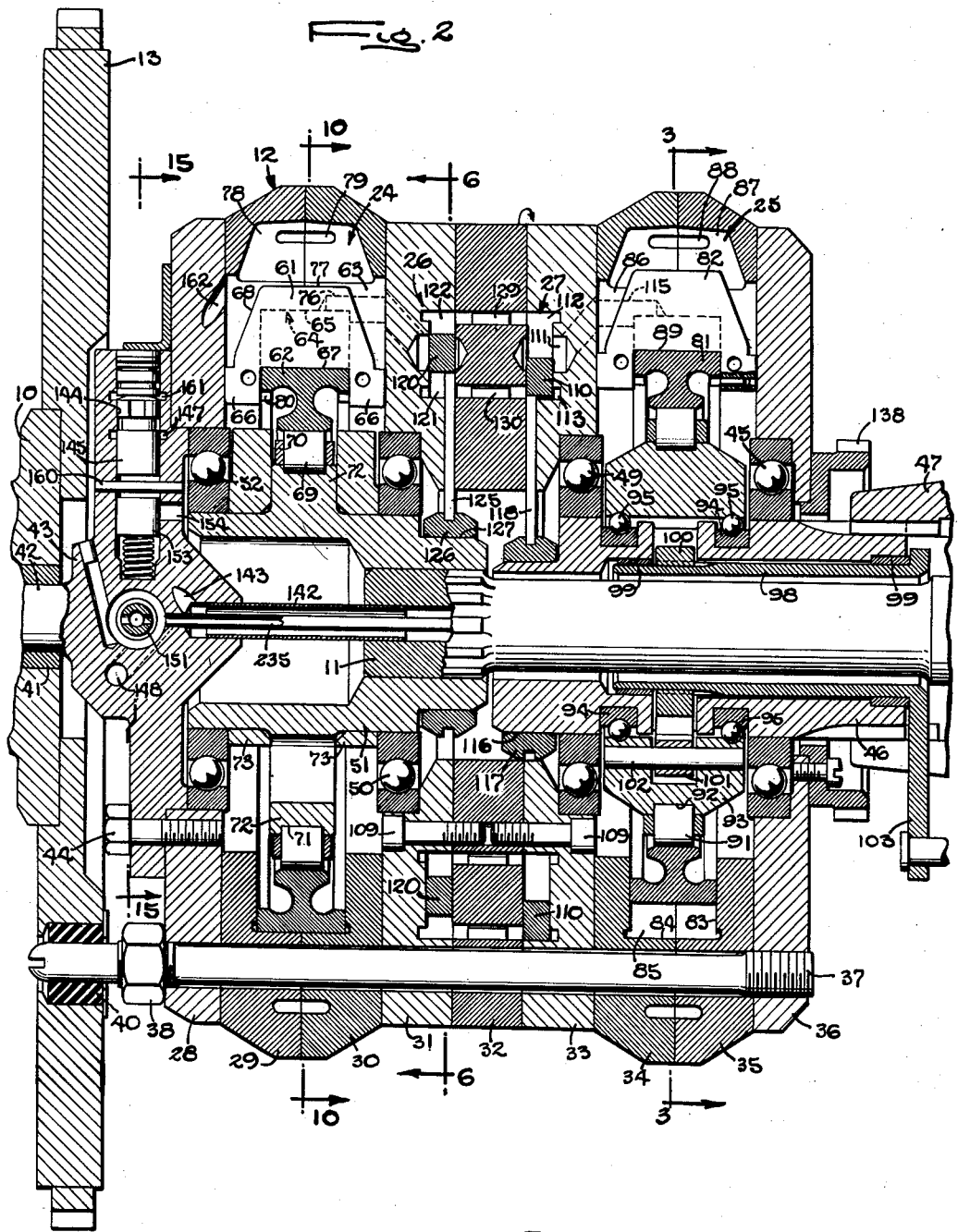

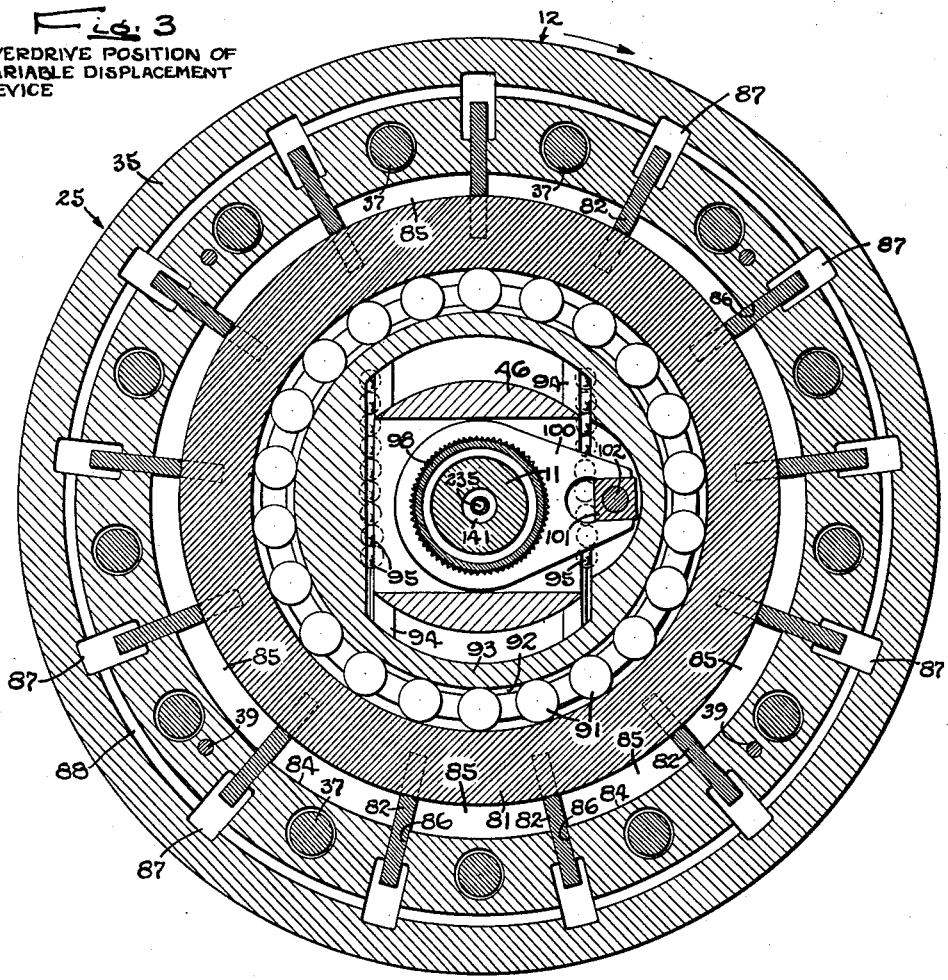

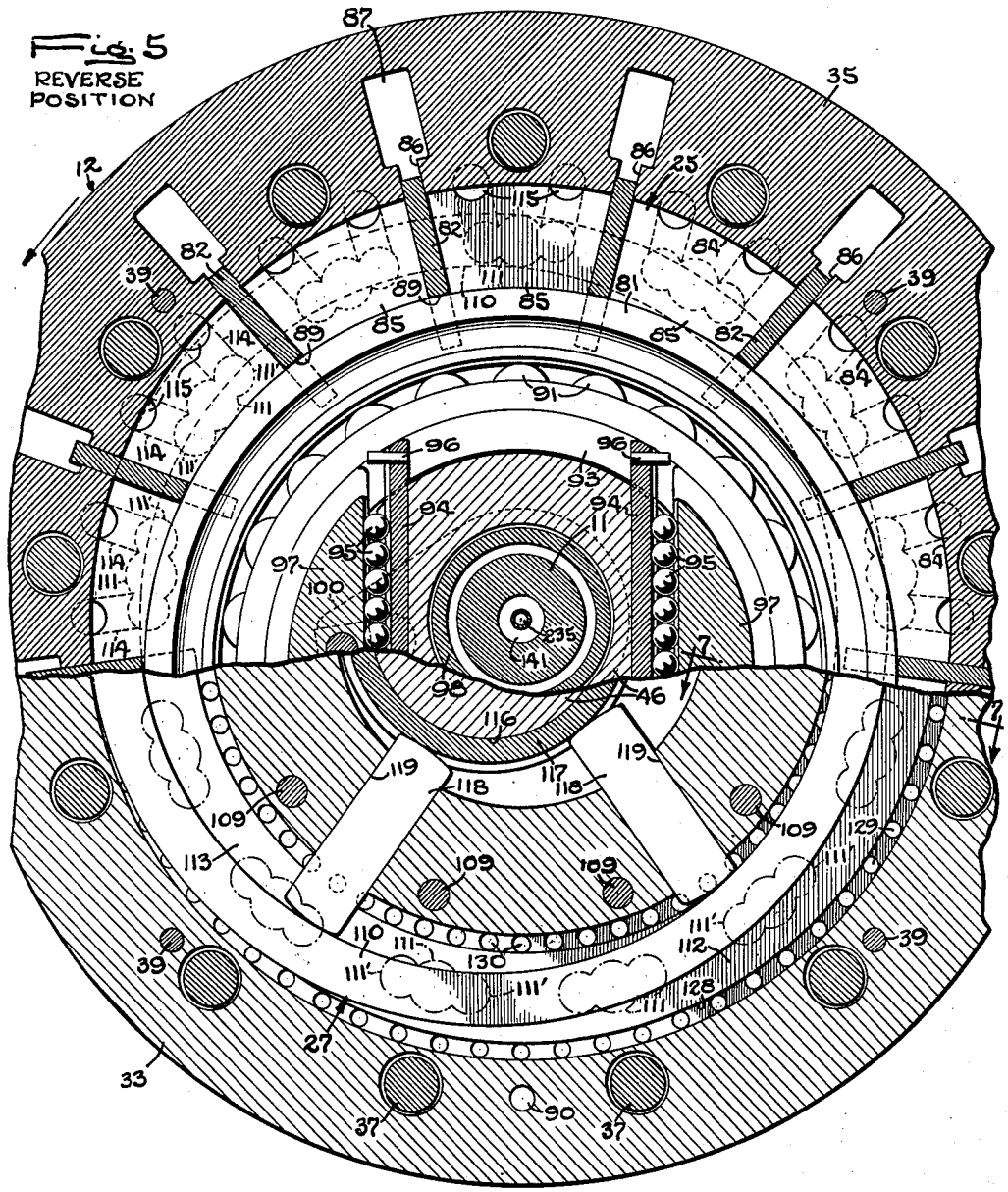

INVENTOR
Gunnar A. Wahlmark
By Carlson, Pitzner, Hubbard & Wolfe
ATTORNEYS

June 8, 1954 G. A. WAHLMARK 2,680,348
ROTARY PUMP AND MOTOR HYDRAULIC TRANSMISSION
Filed May 20, 1950 14 Sheets-Sheet 6
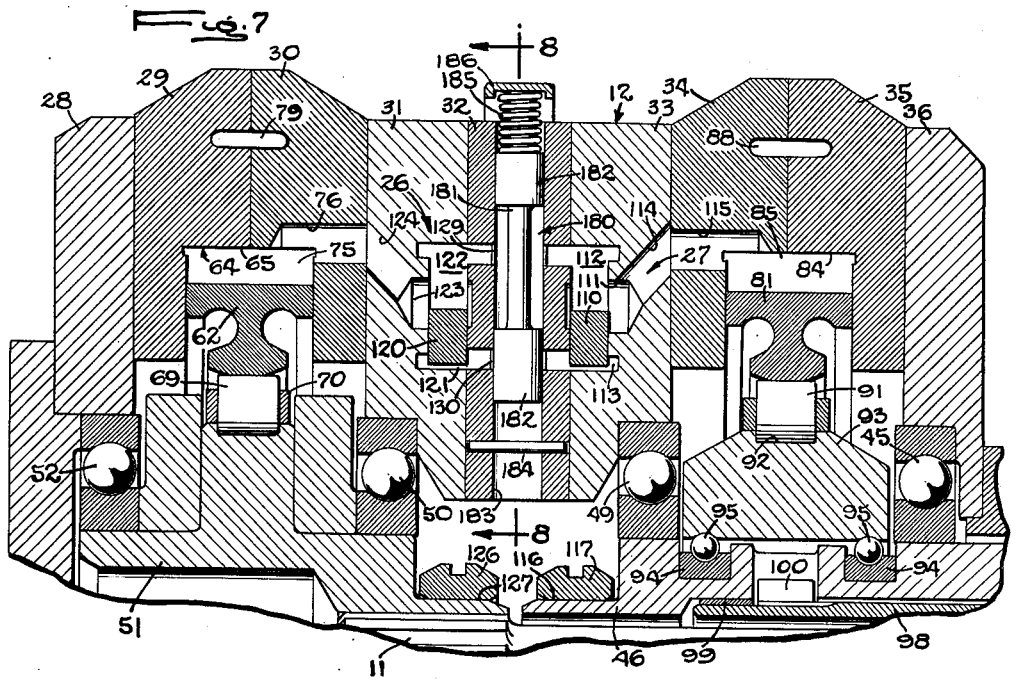
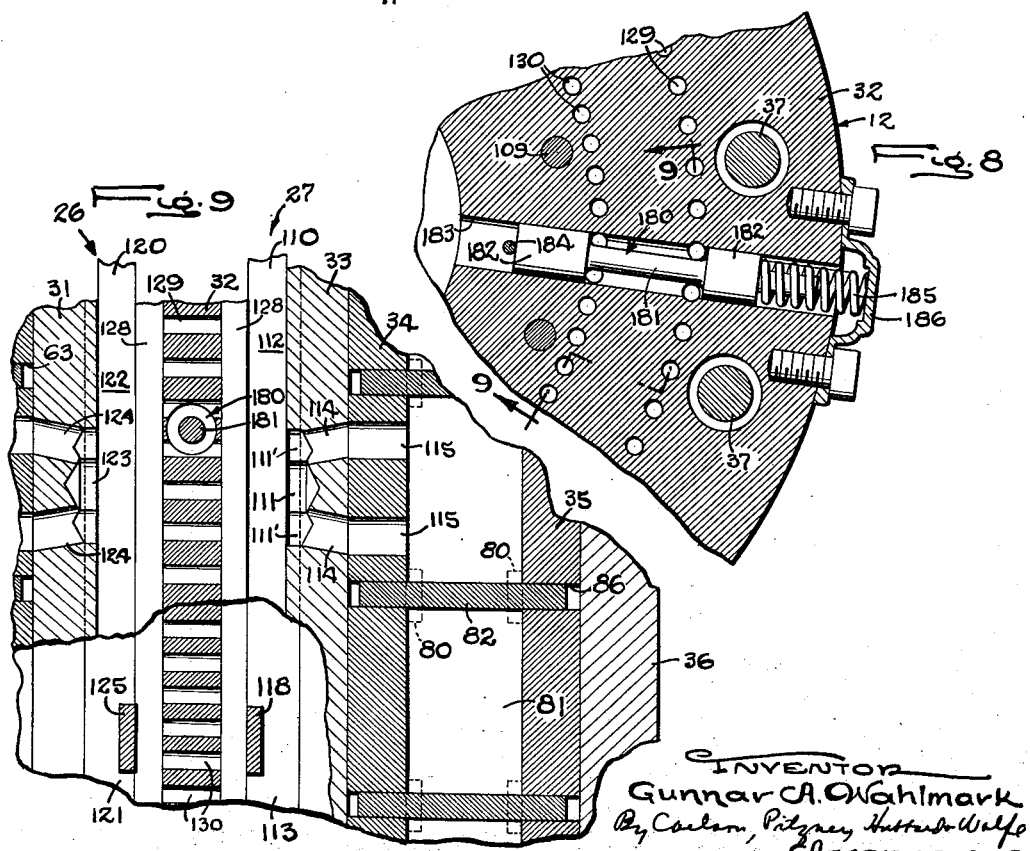
INVENTOR
Gunnar A. Wahlmark
By Carlson, Pitzner, Hubbard & Wolfe
ATTORNEYS

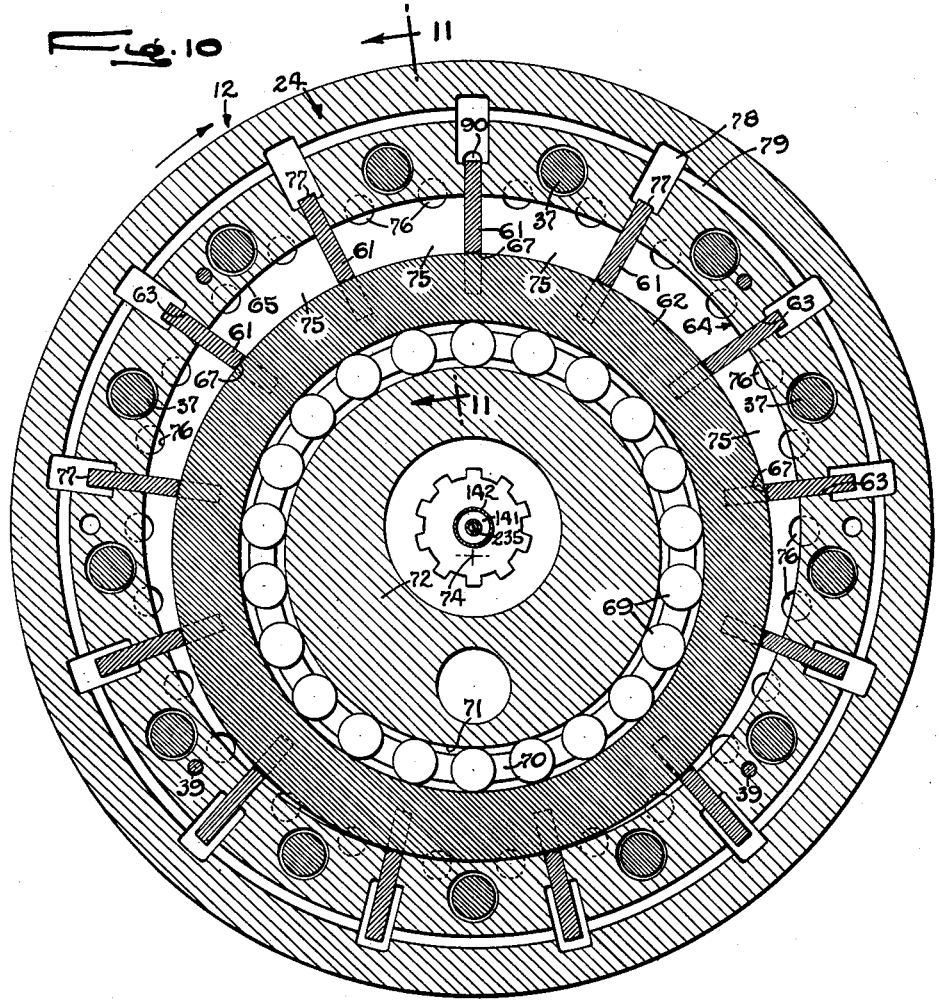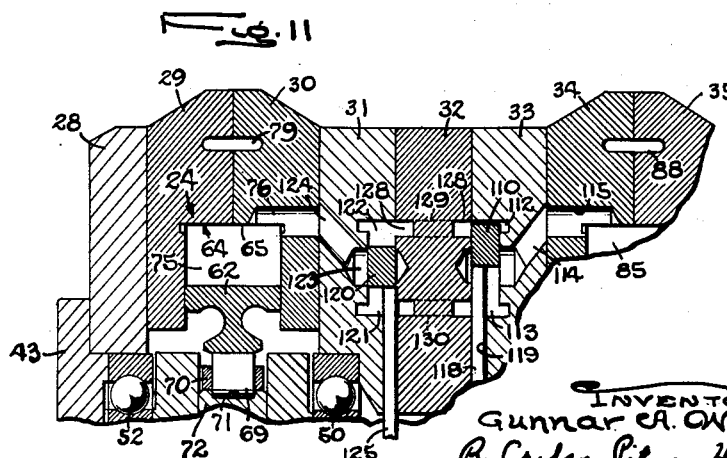

June 8, 1954  G. A. WAHLMARK  2,680,348
ROTARY PUMP AND MOTOR HYDRAULIC TRANSMISSION
Filed May 20, 1950  14 Sheets-Sheet 8
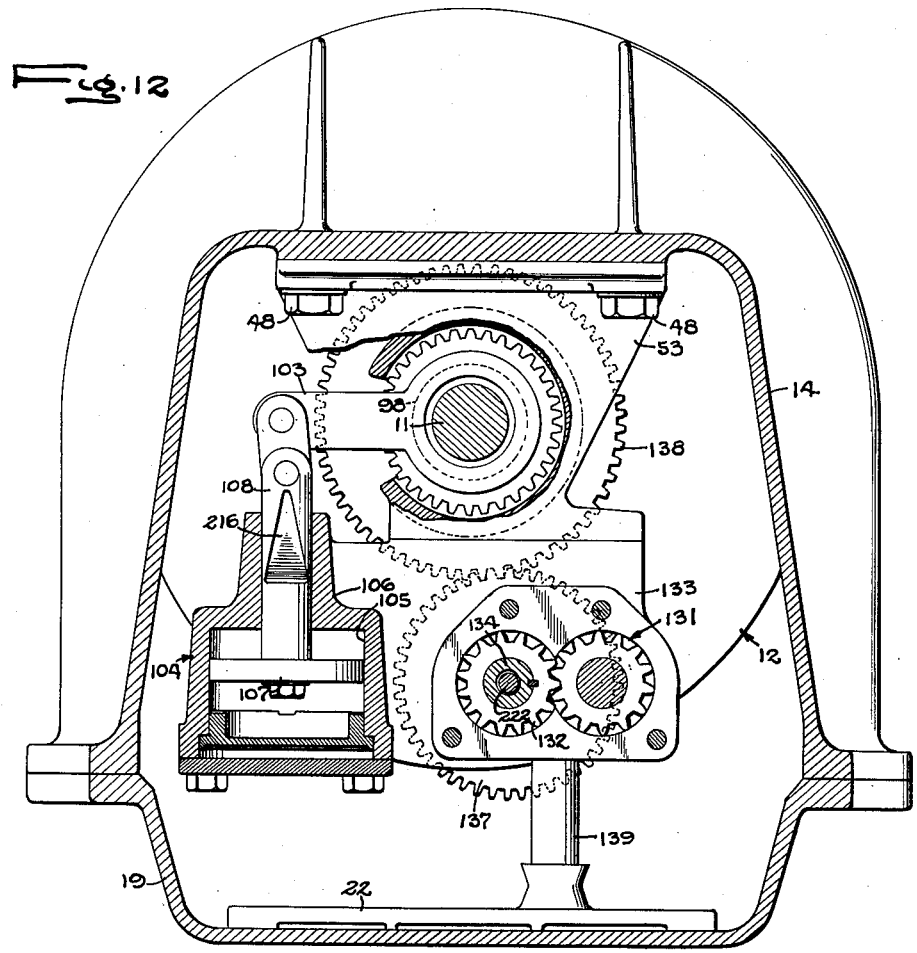
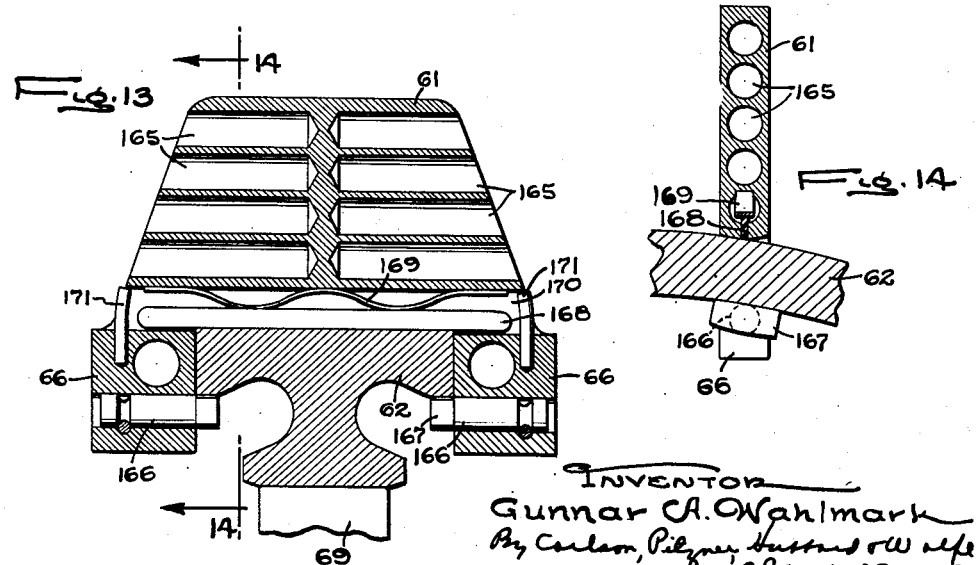
INVENTOR
Gunnar A. Wahlmark
ATTORNEY

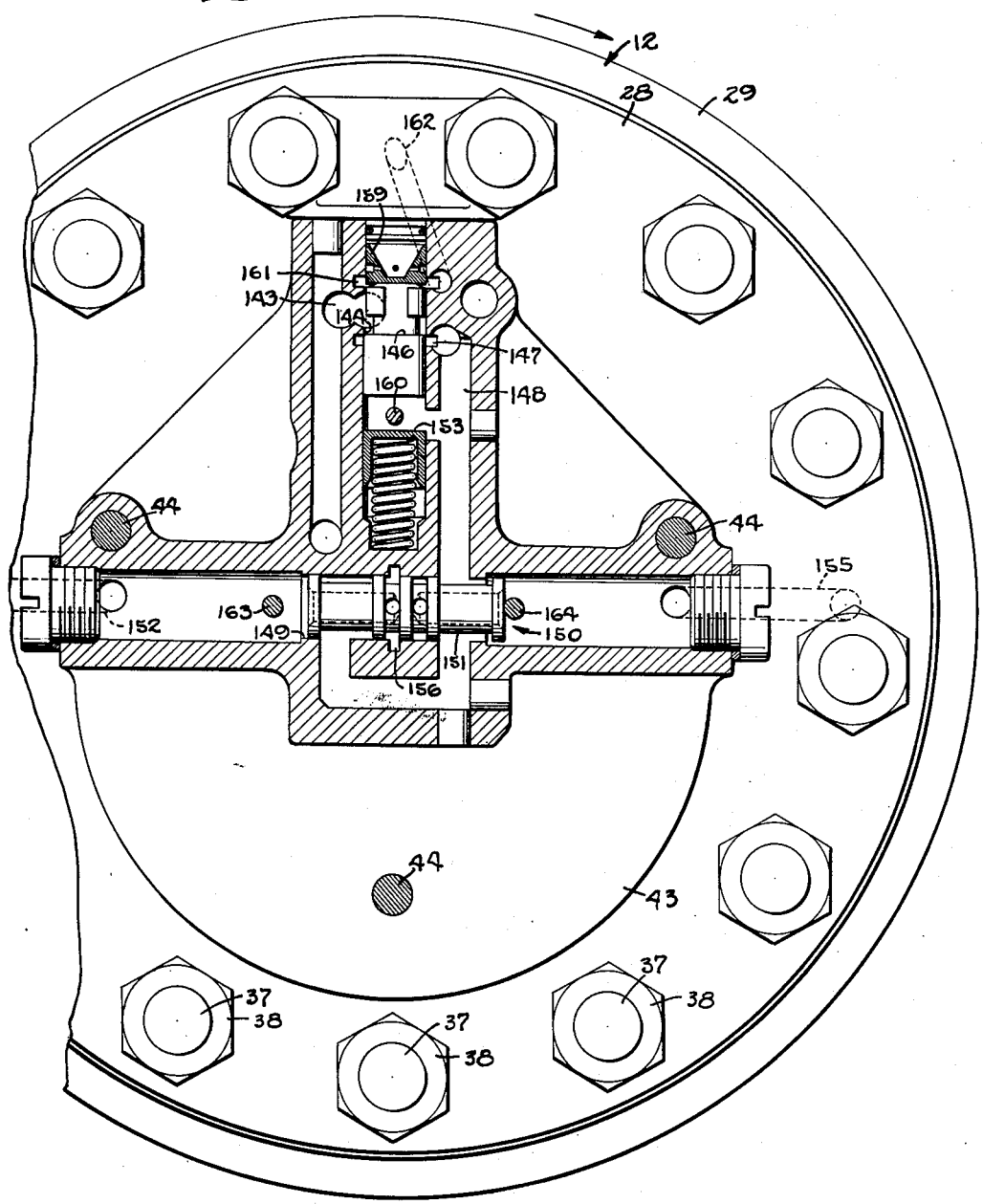

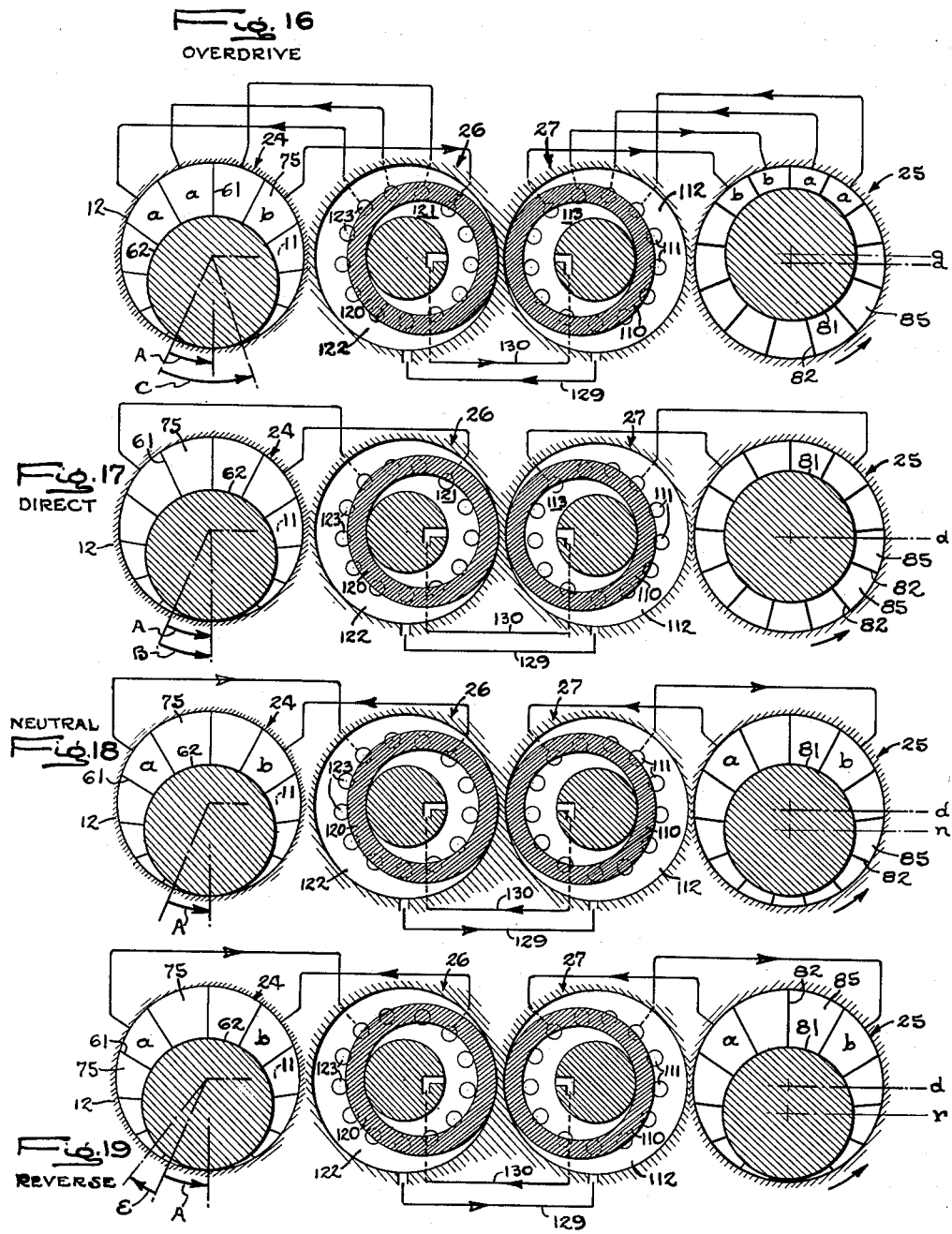

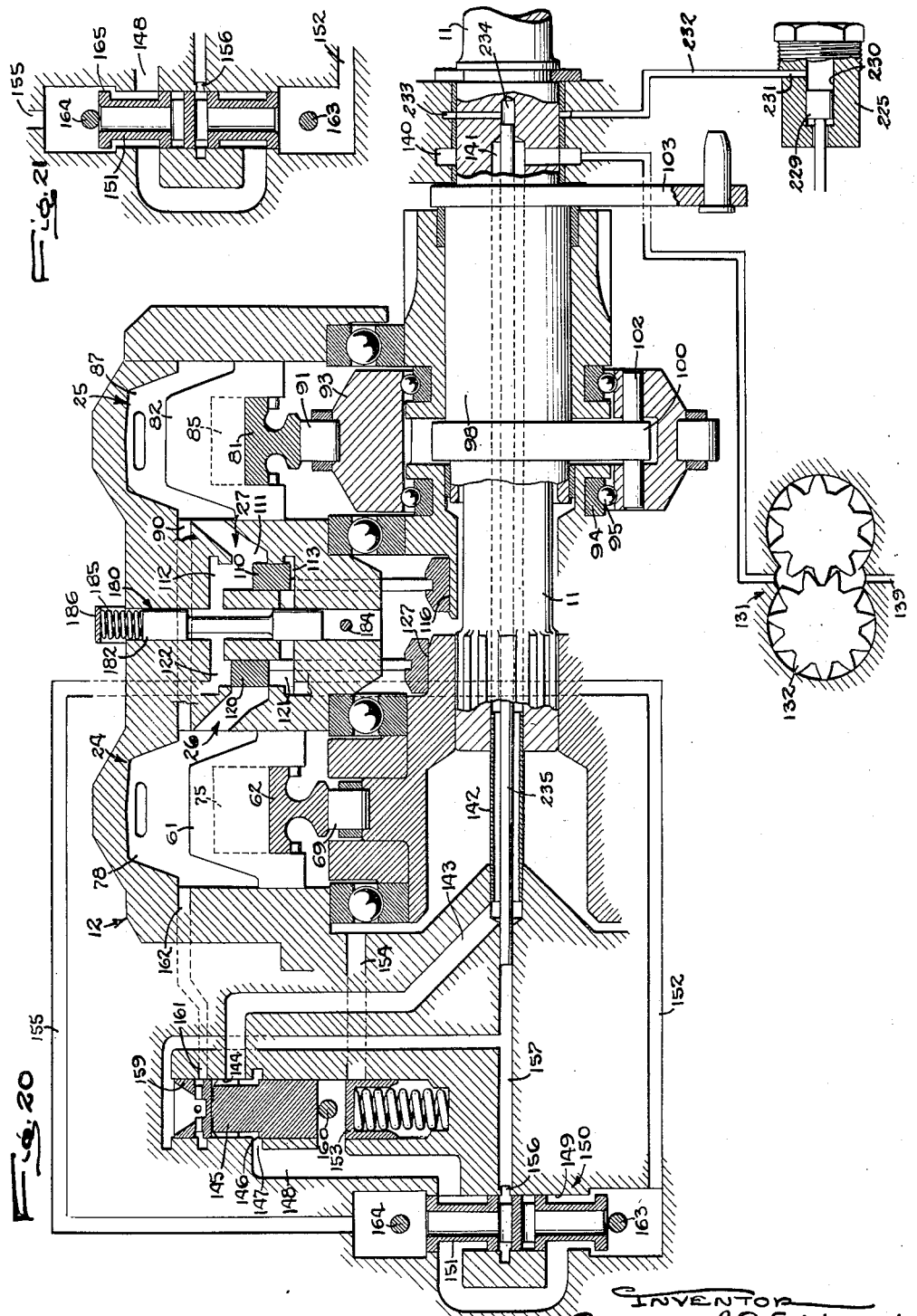

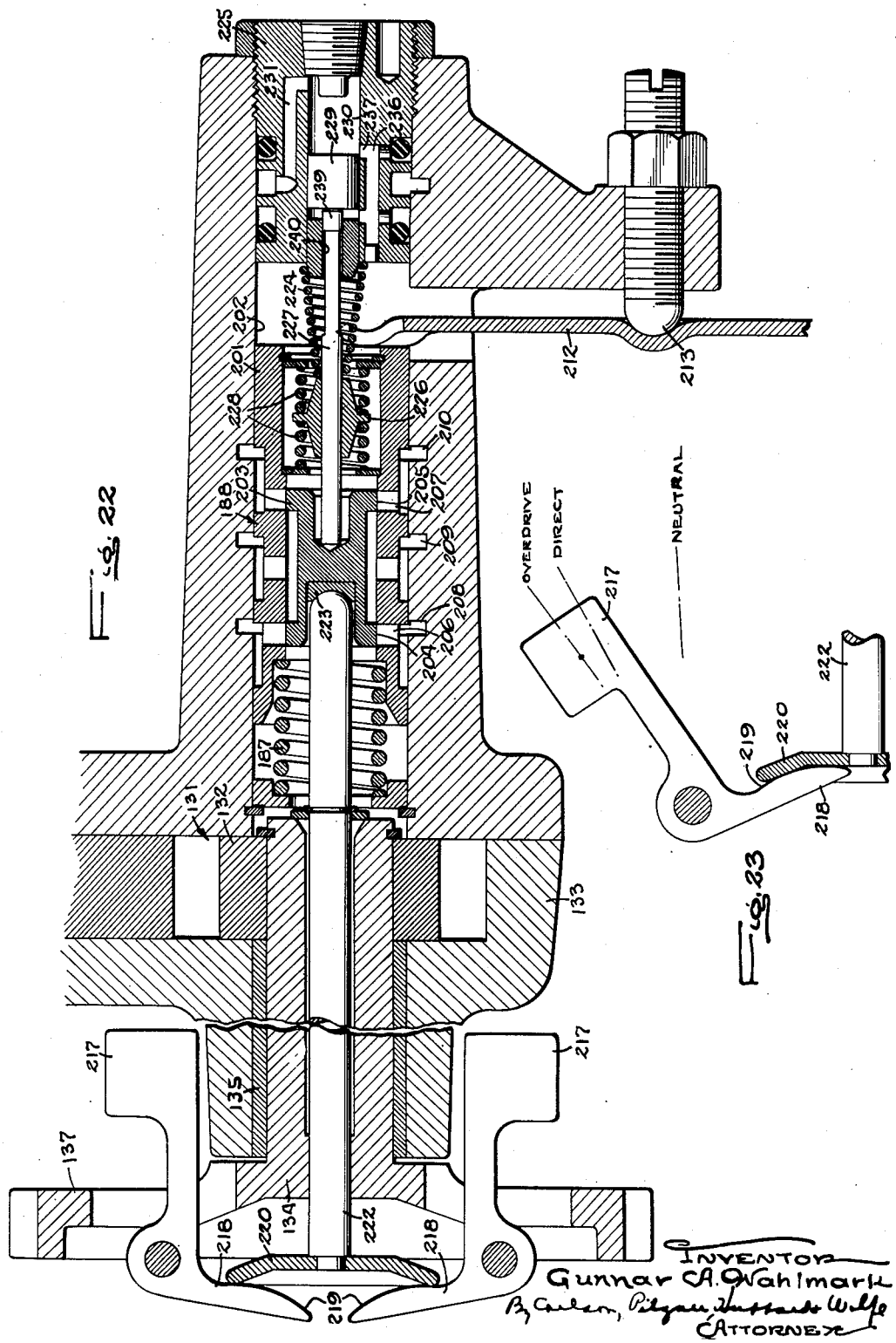

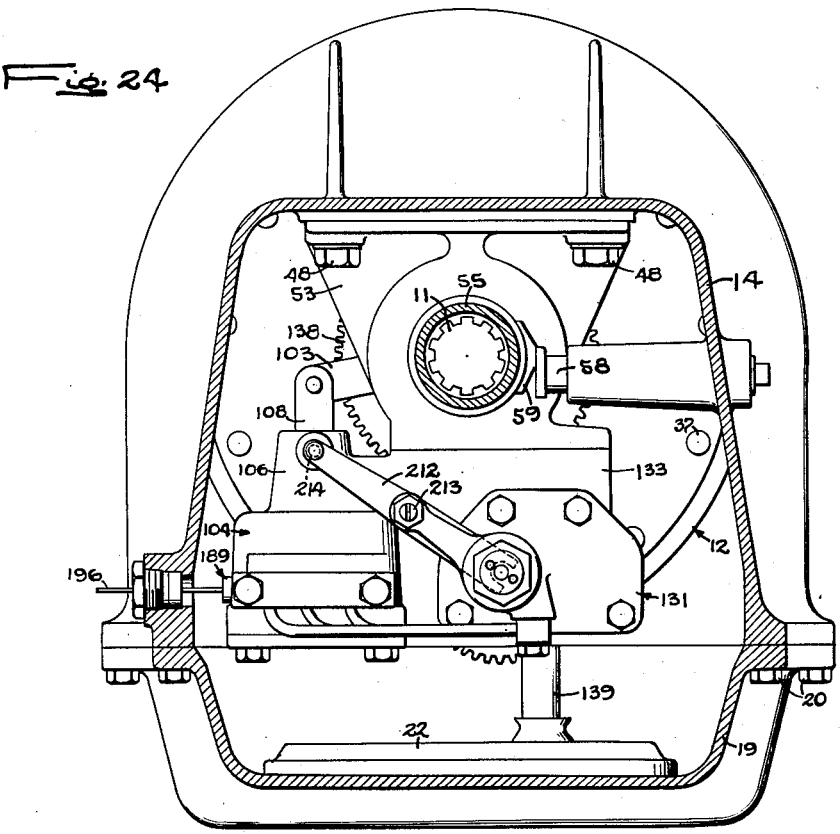
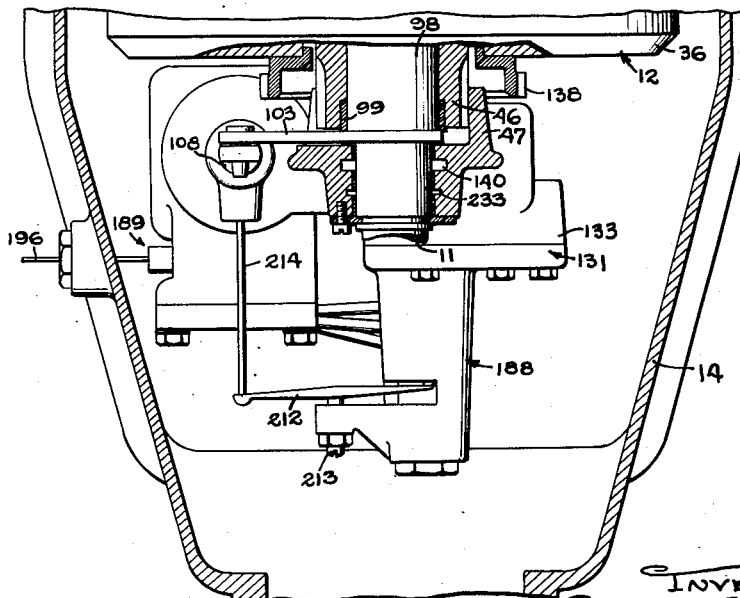

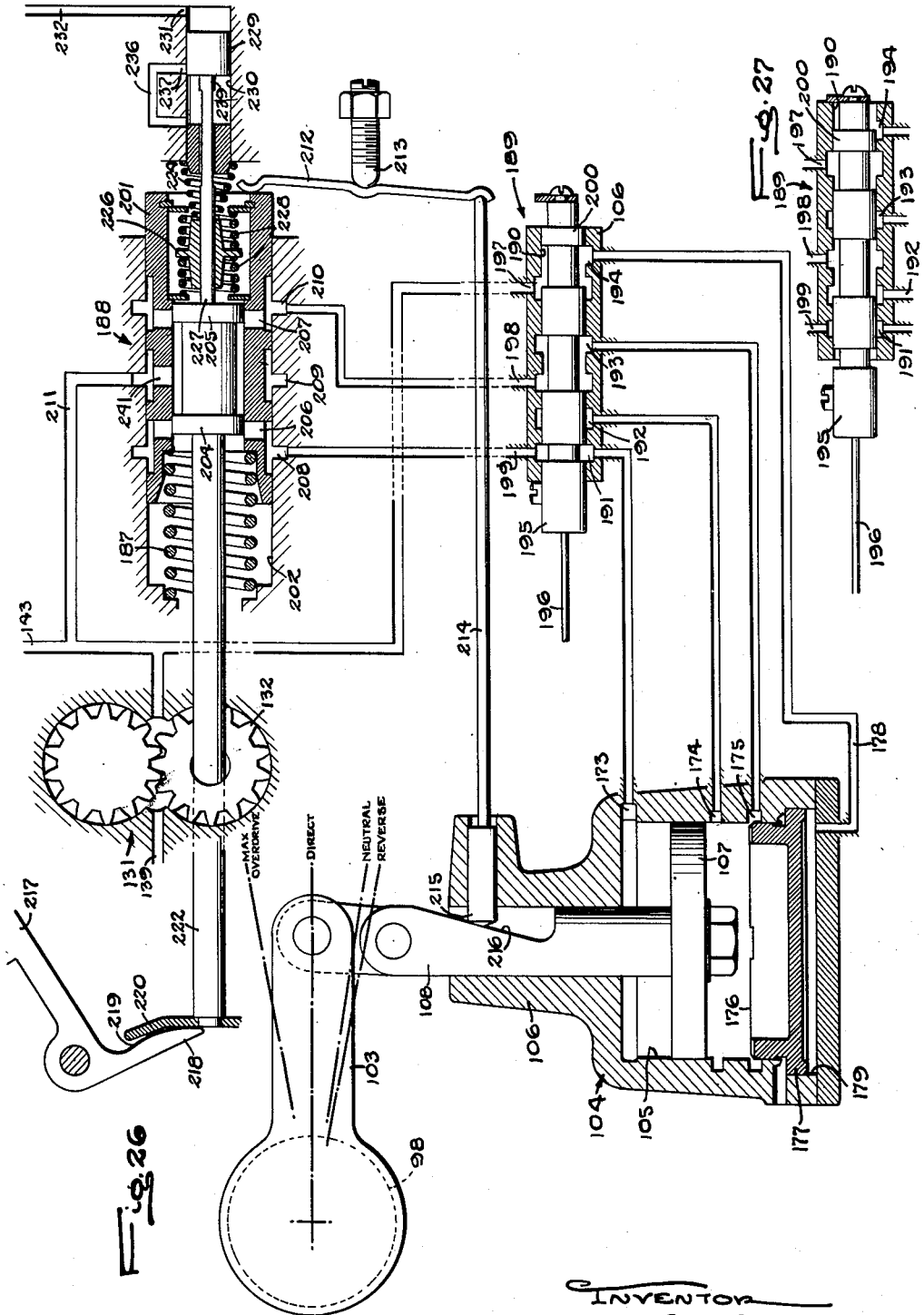

Patented June 8, 1954

2,680,348

UNITED STATES PATENT OFFICE 2,680,348

ROTARY PUMP AND MOTOR HYDRAULIC TRANSMISSION

Gunnar A. Wahlmark, Rockford, Ill.

Application May 20, 1950, Serial No. 163,142

17 Claims. (Cl. 60—53)

This invention relates to a hydraulic transmission including a pump and an associated fluid motor for transmitting rotary power at progressively variable ratios and has more particular reference to a transmission of the fluid differential type in which part of each fluid displacing device rotates with the driving element and changes in the speed ratio are achieved by varying the relative displacement capacities of two fluid displacing devices.

A general object is to provide a hydraulic transmission which, as compared to prior transmissions of the differential type, is simpler in construction, more economical to manufacture, lends itself better to mass production methods of manufacture, operates at higher efficiency, and is more readily reversible and adaptable of overdrive ratios.

Another object is to construct and arrange the parts of the transmission in a novel manner which enables the forces for clamping the assembled parts together to be increased to the required value and utilized effectually in minimizing leakage within the transmission under various operating conditions.

A more detailed object is to employ fluid displacement devices of the vane type with movable vanes arranged around the interior of a multiple part hollow rotor and actuated by eccentric rings also disposed within the rotor so as to permit any desired number of bolts for clamping the rotor parts together to be located exteriorly of the vanes.

A further object is to utilize the highest pressure developed in the transmission to seal the vane ends against the actuating rings in a novel manner, and overcome at all times the effect of the centrifugal forces tending to break the seal.

Another object is to control communication beween the two fluid displacement devices of the transmission by valves having relatively gyratable elements constructed and actuated in a novel manner.

Still another object is to provide a fluid differential type of hydraulic coupling which, by selective adjustment of the capacity of the variable displacement part of the coupling, may be adapted for the transmission of driving motion at progressively variable underdrive and overdrive ratios.

A further object is to obtain the overdrive ratios in a transmission of the above character by reversing the phase relationship between the actuating eccentrics of the two fluid displacement devices.

Another object is to provide for reversing the direction of transmission of rotary motion through the hydraulic coupling by adjusting the displacement capacity of the variable displacement device of the transmission.

Another object is to provide a fluid servo of novel construction for positioning the adjustable part of the variable displacement device.

A further object is to provide for automatic disabling of the transmission in response to a reduction in the speed of the driving element below a predetermined value.

Another object is to provide a novel mechanism for adjusting the drive ratio automatically to adapt the transmission for efficient use under the varying conditions encountered in the use of the transmission on an automotive vehicle.

Still another object is to adjust the drive ratio of the transmission automatically and selectively in response to the speed of the driving element combined with the torque being transmitted to the driven element.

The invention also resides in the novel arrangement and mounting of the driven element of the transmission within the hollow rotor, in the manner of mounting the rotor removably on a driving part, the novel manner of supplying make-up fluid to the transmission under the various underdrive and reverse drive conditions, and to the novel and simple construction of the speed responsive means for disabling the transmission.

Other objects and advantages of the invention will become apparent from the following detailed description taken in connection with the accompanying drawings, in which Figure 1 is a fragmentary longitudinal sectional view in a vertical plane through the crank and propeller shafts of an automotive vehicle equipped with a fluid transmission embodying the novel features of the present invention, the casing of the transmission being shown in elevation.

Fig. 2 is a horizontal section taken on the line 2—2 of Fig. 1.

Fig. 3 is a section taken along the line 3—3 of Fig. 2.

Fig. 4 is a perspective view of part of the ratio adjuster of the transmission.

Fig. 5 is a fragmentary broken section taken along the line 5—5 of Fig. 1 with the parts shown in "reverse" position.

Fig. 7 is a fragmentary section taken along the line 7—7 of Fig. 5.

Fig. 8 is a fragmentary section taken along the line 8—8 of Fig. 7.

Fig. 9 is a fragmentary section taken along the line 9—9 of Fig. 8.

Fig. 10 is a section taken along the line 10—10 of Fig. 2.

Fig. 11 is a fragmentary sectional view similar to Fig. 7 and taken along the line 11—11 of Fig. 10.

Fig. 12 is a fragmentary sectional view taken along the line 12—12 of Fig. 1.

Fig. 13 is a fragmentary view of a modified form of vane and its mounting.

Fig. 14 is a fragmentary section taken along the line 14—14 of Fig. 13.

Fig. 15 is a fragmentary sectional view taken along the line 15—15 of Fig. 2.

Figure 6:
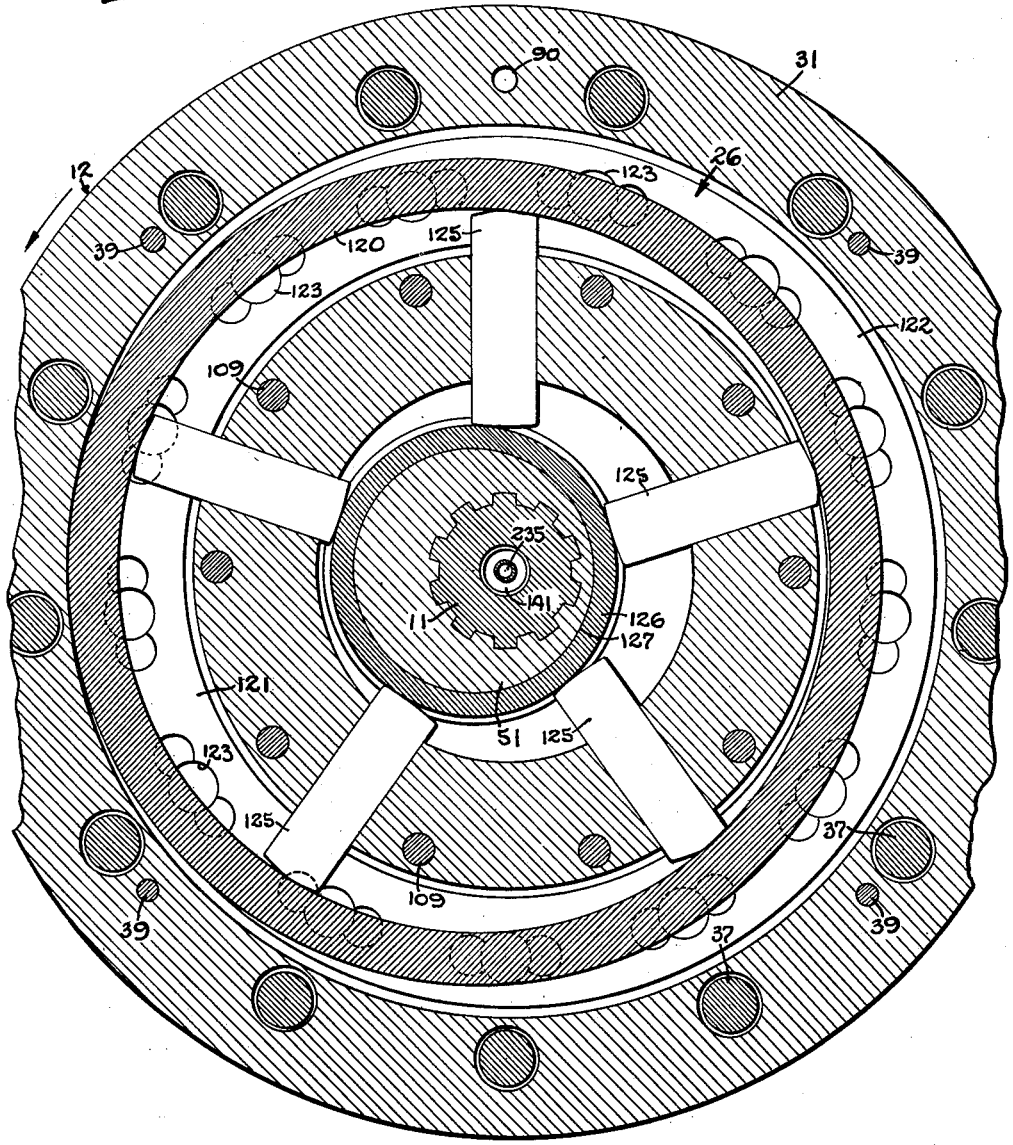
Fig. 6 is a fragmentary sectional view of part of the valve mechanism, the section being taken along the line 6—6 of Fig. 2.

Figs. 16, 17, 18, and 19 are schematic views and flow diagrams illustrating the "overdrive," "direct," "neutral," and "reverse" conditions.

Fig. 20 is a fragmentary sectional view including a part of Fig. 2 and a hydraulic circuit diagram.

Fig. 21 is a fragmentary sectional view of a part of Fig. 20 showing a different position of the transfer valve.

Fig. 22 is a fragmentary sectional view of the automatic control for the transmission, the section being along the line 22—22 of Fig. 1.

Fig. 23 is a fragmentary view showing a different position of the governor flyball.

Figs. 24 and 25 are fragmentary sectional views taken respectively along the lines 24—24 and 25—25 of Fig. 1.

Fig. 26 is a schematic view and hydraulic circuit diagram of the control for the ratio adjusting servo.

Fig. 27 is a longitudinal sectional view of the "reverse" control valve showing a position different than Fig. 26.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

For purposes of illustration, the improved transmission is shown in the drawings in a form especially suited for use in automotive vehicles for transmitting rotary power from an input shaft 10 (Fig. 1) which may be the crankshaft to a shaft 11 adapted for connection with the propeller shaft of the vehicle. Preferably, the rotary driving parts of the transmission are formed by and enclosed within a multiple part casing 12 which is drivingly coupled to the crankshaft flywheel 13 and disposed, along with parts of the automatic control mechanism, within a housing 14 which at its forward end is clamped by bolts 15 to a part 16 on the prime mover. At its rear end, the housing 14 is of reduced diameter and secured by bolts 17 to the forward end of the propeller shaft housing 18.

To permit convenient removal of the transmission unit, the bottom of the housing 14 is formed as a separate piece 19 extending the full length of the housing proper and detachably secured to the latter by screws 20. This piece forms an oil sump filled and drained through a plugged opening 21 and incorporating a suitable screen 22 or the like for filtering the oil returned from the transmission.

The transmission proper comprises generally two axially spaced fluid displacement devices 24 and 25 (Fig. 2) of fixed and variable capacities, connecting passages for transferring fluid simultaneously in opposite directions between these devices, and two valves 26 and 27 which control the fluid transfer. All of the movable elements of these two displacement devices, the valves, and the connecting fluid passages are mounted on and enclosed within the casing 12 which constitutes the driving element or rotor of both displacement devices. The rotor is of hollow construction and comprises a plurality of ring-like parts or disks numbered 28 to 36 specially shaped to facilitate convenient machining by high production methods and firm clamping together in end to end relation by an adequate number of tie bolts 37 extending through and closely spaced around the outer periphery of rotor parts. Herein, each bolt is threaded at one end (Fig. 2) into the end plate 36 of the rotor, and at its other end carries a nut 38 tightened against the other rotor end plate 28. The bolts project loosely through the rotor parts which are doweled together in precise alinement by four pins 39 (Fig. 2).

The heads of the bolts 37 project into bushings 40 of firm but yieldable material spaced around the flywheel 13 and coupling the rotor 12 to the flywheel and engine crankshaft while permitting convenient uncoupling by shifting the casing axially to withdraw the bolt heads out of the flywheel. To center the rotor relative to the drive shaft 10, a bushing 41 (Fig. 1) in the end of the crankshaft receives with an accurate fit a stub shaft 42 on a hub 43 piloted into the end plate 28 of the rotor and clamped to the plate by a series of screws 44.

Pressed into a counterbore in the other end plate 36 of the rotor is the outer race ring of an antifriction bearing 45 (Figs. 1 and 2) whose inner ring is pressed onto the sleeve 46 projecting about halfway through the rotor. The outer end of the sleeve is splined and fits loosely into an internally toothed segmental flange 47 on a bracket 53 removably secured by screws 48 in the housing 14, the flange projecting a short distance into the larger part thereof. The sleeve is thus held against rotation and constitutes the reaction sustaining part of the transmission.

A ballbearing 49 (Fig. 2) is pressed onto the inner end portion of the sleeve 46 and into a counterbored portion of the rotor part 33 which constitutes one end of the housing for the valve 27. The opposite end of the part 31 is similarly supported through a ballbearing 50 pressed onto the inner end portion of a sleeve 51 which extends axially through the fixed capacity fluid displacement unit 24 and is supported at its outer end by a bearing 52 pressed into the end plate 28 of the rotor 12. The sleeve 51 is thus freely rotatable within the rotor, and its inner internally splinned end interfits with the toothed end of the driven shaft 11 which projects along the rotor axis in the opposite direction and outwardly beyond the rear end of the rotor where the shaft is journaled in a bearing 54 on the bracket 53.

The extreme rear end of the driven shaft 11 is splined into the forward end of a tube 55 (Fig. 1) whose rear end is internally toothed and normally meshes with external gear teeth 56 on the forward end of the vehicle propeller shaft 57. When the tube is shifted forwardly to disengage the teeth of the clutch, the transmission and the vehicle engine may be operated idly and independently of the vehicle wheels as is frequently desirable in adjusting the engine. Such disengagement of the clutch may be effected by turning the outer end of a shaft 58 (Fig. 24) journaled in and projecting through the housing 14 and carrying at its inner end a crank having a finger 59 thereon which rides in an external groove 60 on the tube 55.

With the transmission unit thus coupled to the crank and propeller shafts 10 and 57, it may be removed easily from its housing 14 after taking off the bottom plate 19, loosening the screws 48 to release the bracket 53, and turning the shaft 58 to disengage the clutch 56. The rotor may then be shifted rearwardly to withdraw the bolt heads 37 from the flywheel and the stud 42 from the crankshaft. The unit may then be lowered through the bottom opening in the housing 14.

In the form herein shown, the fixed capacity fluid displacement device 24 is of the vane type comprising a series, 13 in the present instance, of flat blades or vanes 61 (Figs. 2, 9, and 10) mounted on the rotor 12 for radial movement and actuated by an eccentric or actuator ring 62 which, in accordance with one aspect of the present invention, is disposed internally of the vanes and the hollow rotor 12. The vanes are supported by and slidable radially in slots 63 and angularly spaced equidistantly around the inner peripheral portions of the rotor parts 29 and 30 which form the casing of the displacement device 24. The adjacent faces of these parts are counterbored axially to form an inwardly opening peripheral groove 64 having a squared cylindrical bottom 65 disposed adjacent but spaced inwardly from the bolts 37. The slots 63 extend outwardly somewhat beyond the cylindrical periphery of the groove 64.

The vanes 61 are flat and generally U-shaped having parallel legs 66 which straddle and fit closely against opposite sides of the eccentric ring 62, against the outer cylindrical periphery of which the slightly rounded inner end 67 of the vane proper bears and is held in effective sealing engagement at all times. If desired, the outer corners of the vanes may be cut away as indicated at 68 (Fig. 2). The reactor ring 62 is of T-shaped cross section and its narrow inner surface bears against antifriction rollers 69 held angularly spaced in any suitable way between retainer rings 70. On their inner sides, the rollers ride in a groove in the external cylindrical surface 71 of an eccentric flange 72 formed around the exterior of the driven sleeve 51 and separated from the inner races of the bearings 50 and 52 by spacers 73. The ring 62, which is of uniform radial width, is thus free to rotate about the axis 74 of the eccentric 71. The external surface of the ring cooperates with each pair of adjacent vanes 61 and with the sides and bottom of the casing groove 64 to form chambers 75 which expand and contract alternately in successive half revolutions of the rotor 12. Holes 76 drilled through the rotor part 30 and one wall of the groove 64 form an inlet through which fluid is drawn into the chamber during expansion thereof and an outlet through which an equal volume of fluid is forced during contraction of the chamber. The amount of fluid thus displaced during successive half revolutions is determined by the throw of the eccentric ring 62 and therefore the stroke of the vanes 61. In this instance, the eccentricity of the ring is fixed and therefore the device 24 has a fixed fluid displacement capacity.

To overcome the centrifugal forces acting on the vanes during turning of the rotor and to seal the inner ends 67 effectually against the ring 62, the outer ends 77 including the cut-away portions 68 of the vanes are made of substantially greater area than the inner ends and, in the form shown in Figs. 2 and 10 are subjected over the full area to fluid at a pressure which is the highest available within the transmission, this being the pressure existing in the vane chambers 75 during contraction thereof. For this purpose, an outer radially disposed recess 78 is formed in the rotor parts 29 and 30 beyond the outer end of each vane and each recess intersects the outer ends of the slots 63 in which the opposite edge portions of the vane are guided. The recesses 78 are disposed between the adjacent tie bolts 37 (see Fig. 10) and are connected together by a passage 79 extending around the entire periphery of the rotor 12 externally of the bolts. The inner ends of the vane legs 66 are exposed to atmospheric pressure so that with the same fluid pressure exerted on the inner and outer ends 67 and 77 of the vane, the latter will be urged inwardly by a force equal to this pressure multiplied by the difference in the areas of these two vane ends. This difference in area is made large enough to insure proper sealing of the vanes against the ring 62 at all times. In the present instance, the net sealing pressure on each vane may rise to about 250 pounds which is ample to maintain an effective seal at a rotor speed of 3600 R. P. M.

When the transmission is idle and no sealing pressure is available, the vanes are held mechanically against falling outwardly away from the ring 62. Herein, this is accomplished by two pins 80 projecting inwardly from the inner ends of the vane legs 66 and overlapping the edges of the wider outer part of the actuator ring 62. The pins are held in their holes by suitable retainers and are disposed close to but out of contact with the ring when the vane ends 67 are, as is normally the case, in sealing engagement with the ring.

Most of the parts of the fixed displacement device 24 are duplicated in the variable displacement device 25 (Figs. 2, 3, and 4) which is of the same construction except for mounting of its reactor ring 81 for transaxial adjustment to vary the displacement capacity of the device. In the latter, the rotor parts 34 and 35 form a casing enclosing and slidably supporting thirteen vanes 82 whose rounded inner ends bear against the ring 81 which, as in the device 24, cooperates with adjacent pairs of vanes and with the side and bottom walls 83 and 84 of the casing groove to define expandible and contractible chambers 85. As before, the side portions of the vanes 82 are guided in slots 86 which at their outer ends communicate with recesses 87 and a channel 88 filled with high pressure fluid which acts as described above on the differential area of the vane ends to press the vanes inwardly and maintain sealing engagement between the actuator ring 81 and the inner vane ends 89. A passage 90 (Fig. 20) extending through the rotor 12 connects the recesses 78 and 87 surrounding the vanes of both of the displacement devices 24 and 25 so that the vanes of both sets are pressed inwardly under the same sealing pressure.

The eccentric ring 81 is supporting by antifriction rollers 91 (see Figs. 2, 3, and 5) spaced around and riding in a groove 92 in a ring 93 which is disposed between the rotor supporting bearings 45 and 49 and mounted on the nonrotatable sleeve 46 for rectilinear adjustment transversely of the rotor axis. For this purpose, the intermediate portion of the sleeve is flattened as shown in Fig. 5 and two sets of hardened bars 94 seated in grooves in the sleeve (see Fig. 2) and are secured thereto within opposite ends of the eccentric ring 93. These bars provide inner raceways for four sets of balls 95 which are held in the raceways by end pins 96 and ride in grooves extending across the opposed flat sides of segments 97 integral with the interior of the eccentric ring 93.

Shifting of the eccentrics 81 and 93 back and forth is effected in the present instance by turning a tube 98 (Figs. 2, 3, 4, and 20) journaled in bearings 99 within the sleeve 46 and projecting outwardly beyond the outer sleeve end. Splined on the inner end of the tube in the central plane of the actuator ring 81 and in a hollowed out part of the sleeve 46 is an arm 100 whose forked outer end straddles a block 101 on a pin 102 projecting through the ring 93 parallel to the rotor axis.

Integral with the outer end of the tube 98 is an arm 103 which may be actuated manually or automatically depending on the use to which the transmission is to be put. Herein, the adjustment is effected by a hydraulic servo 104 (Figs. 1 and 12) including a stationary cylinder 105 in a casting 106 integral with a bracket which is bolted to the bracket 53 above referred to at the rear end of the enlarged part of the main housing 14. A piston 107 slidable in the cylinder is bolted to the end of a rod 108 which is guided in the casting 106 and at its outer end is connected by a link to the eccentric adjusting arm 103. By admitting pressure fluid to opposite ends of the cylinder 105, the piston 107 may be shifted to the various positions o, n, u, d, and r indicated in Figs. 16 to 19 thus turning the sleeve 98 and shifting the ring 93 to correspondingly adjust the throw of the eccentric actuator ring 81.

To enable the transmission to be used in reversing the rotor motion as applied to the driven member 11 as will be described later, the displacement device 25 is made adjustable to a capacity somewhat greater than that of the fixed displacement device 24. Herein, this is accomplished by increasing the throw of the adjustable eccentric 81 in one of its limit positions to a value greater than the throw of the eccentric 62 of the fixed displacement device. With this setting, the stroke of the vanes 82 will be greater than that of the vanes 61. Herein, the stroke of the vanes 82 at the maximum setting is .770 of an inch as compared to .613 for the vanes 61. With the other parts of the two devices of the same size, the device 25 has a displacement capacity of 14.5 cubic inches per revolution of the rotor 12 while the capacity of the device 24 is fixed at about 12 cubic inches.

The valves 26 and 27 (Figs. 2, 5, 6, 7, 9, and 11) above referred to for controlling the transfer of both high and low pressure fluid between the two displacement devices 24 and 25 are disposed side by side between the casings of the displacement devices and are housed within a casing formed by the three rotor parts 31, 32, and 33. The latter are clamped together in a separate subassembly by screws 109 radially spaced inwardly from the valve parts.

Referring to Figs. 5, 7 and 11, the valve 27 associated with the variable displacement device comprises generally a member 110 which is gyrated relative to the rotor in synchronism with the rotation thereof and coacting with ports 111 leading to the chambers 85 of the displacement device 25 to connect each chamber to an outer valve chamber 112 during half of one rotor revolution and to an inner valve chamber 113 during the remainder of the revolution.

More specifically, the valve member 110 comprises a flat annulus or ring narrower than and slidable transaxially in a wider circular recess which is concentric with the rotor axis and formed by coaction of a flat face of the rotor part 32 with a groove in the opposing face of the part 33. The narrow valve ring 110, which fits closely but slidably in the recess thus formed, divides the latter into the inner and outer valve chambers 113 and 112. The ports 111 which cooperate with the ring 110 are angularly spaced around the chambers midway between the inner and outer edges thereof and, in this instance, each port is formed by drilling partially through the plate a hole equal in width to the valve ring 110 and two adjacent intersecting holes 111' (see Fig. 5) of somewhat smaller diameter centered on the same arc so that at least one of the holes will be uncovered substantially simultaneously with the larger hole. Each of the recesses thus formed in the rotor plate 33 intersects an inclined hole 114 drilled into the outer side of the plate and, in the final assembly, registers with a hole 115 which communicates with one of the chambers 85 of the displacement device 25.

The valve ring 110 is held eccentrically of the rotor axis so that the ring and the associated ports are gyrated relative to each other and in each revolution each of the ports 111 moves back and forth across the ring. This is accomplished by an eccentric surface 116 (Figs. 2 and 5) formed on the inner end of the stationary sleeve 46 forming the bearing of a ring 117 which is externally grooved to receive the inner rounded ends of five spokes 118 guided in radial slots 119 formed in and equidistantly spaced around the rotor plate 33 at its junction with the plate 32. The rounded outer ends of the spokes bear against the inner surfaces of the valve ring 110. Since the eccentric 116 is stationary, the gyration of the valve ring is fixed in relation to the turning of the rotor 12 irrespective of the adjustment of the displacement device 25. Thus, each of the ports 111 will be connected to the outer valve chamber 112 during one half revolution of the rotor and to the inner chamber 113 during the remainder of the revolution. At the point of changeover, the arcuate section of the ring associated with the port will be disposed midway between the inner and outer edges of the valve recess thus completely covering the port 111.

The valve 26 (Figs. 2, 6, 7, and 11) is of the identical construction including a ring 120 radially gyratable in a circular groove formed in the rotor plate 31 and dividing the latter into the inner and outer chambers 121 and 122. Drilled holes forming ports 123 at the center of the groove are connected through holes 124 to the corresponding chambers 75 of the displacement device 24. Spokes 125 bearing against the interior of the valve ring are radially guided in slots in the rotor plate 31 and bear at their inner ends against the bottom of a peripheral groove in a ring 126 journaled on the exterior of an eccentric 127 which is rotatable with the driven or output member 11 thus bearing a fixed angular relation with respect to the actuating eccentric 62 of the fixed displacement device 24. Herein, the eccentric 127 is formed on the exterior of the sleeve 51 at the extreme inner end thereof.

The inner and outer valve chambers of the two valves are respectively connected for the free transfer of fluid therebetween. For this purpose, narrow circular grooves 128 (Figs. 9 and 11) cut in opposite faces of the center plate 32 of the valve casing are connected by holes 129 and register with the outer valve chambers 112 and 122. In a similar way, the inner valve chambers are connected by holes 130 drilled through the plate 32.

Means is provided for automatically making up the leakage of fluid out of the high pressure recesses and passages of the displacement devices and valves during operation of the transmission. Herein, fluid is drawn from the sump 19 by a suitable pump 131 (Figs. 12, 20, 22, and 26), placed under a desired make-up pressure, for example 75 p. s. i., and continuously supplied to one or the other of the valve chambers 121 and 122 whichever is at the lower pressure and connected to the displacement chambers 75 or 85 which are being expanded. The pump shown comprises intermeshing gears 132 journaled in a case 133 bolted to the bracket 53 on the main housing 14. One gear is fast on a sleeve 134 journaled in bearings 135 (Fig. 22) and carrying at its outer end a gear 137 which meshes with a gear 138 (Figs. 1 and 12) bolted to the end plate 36 of the rotor.

Fluid is drawn from the sump through a pipe 139 and delivered through a transfer ring 140 (Fig. 20) to a passage 141 leading axially through the shaft 11 and a tube 142 therein journaled in the rotor hub 43 (see Fig. 2). A passage 143 in the latter directs the fluid to the outer end of a valve cylinder 144 radially disposed in the hub member 43 (Figs. 2 and 20) of the rotor. Normally, the fluid flows inwardly along the fluted outer end of a radially movable valve plunger 145 past a shoulder 146 thereon and thence through a port 147 at the end of a passage 148 leading to the cylinder 149 of a transfer valve 150 carried by the rotor 12. The fluid is free to pass around opposite end portions of a multiple land spool 151 in the cylinder which is normally disposed in the position shown in Fig. 20 so as to pass the make-up fluid through a rotor passage 152 leading to the inner valve chamber 121. The fluid thus supplied is maintained at constant pressure by a spring loaded plunger 153 regulating the escape of fluid from the passage 148 to the pump return line 154 and the sump. As a result, fluid at the make-up pressure is supplied continuously to the expanding chambers 75 and 85 of the displacement devices 24 and 25.

The other end of the transfer valve cylinder 149 is normally connected through a rotor passage 155 to the outer valve chamber 122 and, as a result, the spool 151 is urged by the high fluid pressure to the position shown in Fig. 20. High pressure fluid is thus allowed to flow through one end of the hollow spool and outwardly through a port 156 to a passage 157 leading to the extreme outer end of the cylinder 144 in which the plunger 145 slides. This pressure bears inwardly on a valve member 159 which in turn holds the plunger 145 inwardly against a stop pin 160. The fluid is thus permitted to flow through the member 159 and out through a port 161 and a passage 162 to the recesses 78 and 87 at the outer ends of the vanes. As a result of the action of the valve members 145 and 151 as described above, a sealing pressure equal to and derived from the high pressure valve chamber 122 is applied to the large areas on the outer ends of the vanes 61 and 82 to seal the inner ends effectually against the actuator rings 62 and 81.

With the valve spool 151 shifted against the stop 163 as shown in Fig. 20 under the higher pressure in the outer valve chamber 122, the inner valve chamber 121 is connected through the passages 148 and 152 to the constant pressure supply of make-up fluid. If the pressures in the valve chambers are reversed and that in the inner chamber is the higher, this pressure acts on the spool 151 to shift the latter against the stop 164 as viewed in Fig. 21. The make-up fluid from the passage 148 then flows directly past a land 165 to the passage 155 and the outer valve chamber 122.

During the reversal of the pressures in the valve chambers 121 and 122 as described above, the pressure acting inwardly on the valve member 159 may not be sufficient to overcome the centrifugal force developed by the rotating plunger 145. Under such force, the plunger may move outwardly covering the port 147 whereupon the outlet passage 148 from the pump 131 will be blocked temporarily as shown in Fig. 15 so as to connect the pump outlet passage 143 to the port 161 and thence to the sealing recesses 78. By the pressure thus derived from the pump, adequate sealing of the vanes 61 and 82 is thus maintained during the change-over. When normal pressure conditions have been restored in the valve chambers 121 and 122, the parts will be returned to positions shown in Fig. 20.

If desired, the vanes 61 and 82 of the two displacement devices 24 and 25 may be modified as shown in Figs. 13 and 14 to avoid the necessity of hydraulically sealing the vanes against their actuator rings 62 and 81 as described above. In this construction, the vanes are lightened by forming edgewise opening holes 165 therein and the inwardly projecting legs 66 support T-shaped pins 166 whose heads 167 have curved surfaces which at all times bear against the inwardly facing edge surfaces on the actuator ring 62. Slidable edgewise in a slot 170 in the vane and projecting from the inner edge thereof is a blade 168 which bears against the outer surface of the actuator ring 62 and is larger than the width of the ring. A bowed strip 169 of resilient material is disposed in the vane slot 170 and acts between the blade and the slot bottom to hold the blade in firm sealing contact with the ring 62, the spring being of sufficient strength to overcome the comparatively low centrifugal force acting on the blade 168. Pins 171 pressed into the legs 66 of the vane hold the blade 168 centered properly.

When vanes of the modified type are employed, the plunger 145 and the member 159 (Fig. 20) may be omitted along with the connection 162 leading to the displacement devices. In that case, the valve 150 operates as above described to select which of the valve chambers 121 or 122 is at the higher pressure and connect the make-up fluid supply passage 143 to whichever of the chambers is at the lower pressure.

The operation of the transmission as described above may best be understood by reference to the diagrammatic views (Figs. 16 to 19) and by considering the various conditions which occur in service use including "neutral" when the drive shaft 10 is rotating but no power is being transmitted to the output shaft 11; "underdrive" when the speed of the output shaft is less than that of the driving shaft; "direct drive" when the driving and driven shafts are rotating at the same speed; "overdrive" when the output shaft 11 is turning faster than the input shaft 10; and "reverse" when the driven shaft 11 turns in a direction reverse to that of the driving shaft. These different conditions together with variations of the drive ratios are achieved by shifting the reactor ring 81 of the adjustable displacement device 25 to the different overdrive, direct drive, underdrive, neutral, and reverse positions indicated by the letters, o, d, u, n, and r respectively in Figs. 16 to 19.

*Direct drive.*—When the reactor ring 81 has been shifted to the position d concentric with the axis of the rotor 12 as shown in Fig. 17, no reciprocation of the vanes 82 will take place during turning of the rotor, and the chambers 85 will remain of equal volume. As a result, no fluid will be displaced by the device 25, and no fluid will be transferred in either direction between the displacement devices even though the valves 26 and 27 are conditioned to permit such transfer. Thus, the bodies of fluid trapped in the chambers 85 operate in effect to lock the driving and driven parts of the displacement device together hydraulically and form in effect a rigid drive coupling between these parts causing the output shaft 11 to turn at the speed of the input shaft 10. That is to say, for each displacement of the rotor 12 through an angle A (Fig. 17), the driven shaft 11 will be turned in the same direction and through an equal angle B. Under this direct drive condition, the pressures in the chambers 75 will, of course, build up to a value determined by the prevailing torque load on the output shaft.

*Neutral.*—When the adjustable eccentric ring 81 is disposed in the position n as shown in Fig. 18, the displacement capacity of the device 25 will be precisely equal to that of the fixed displacement device 24. That is to say, the volumetric contraction and expansion of each chamber 85 of the device 25 during each revolution of the rotor will be the same as that of each chamber 75 in the device 24 so that fluid forced out of each contracting chamber a will be transferred through the valves 26 and 27 and into the corresponding expanding chamber b of the device 24 as indicated by the arrows in Fig. 18. As a result, there is no substantial pressure build up within the chambers in which the pressure will correspond to that delivered by the make-up pump. Consequently, no torque is developed and applied to the output shaft 11 which therefore remains stationary during the idle rotation of the rotor.

*Underdrive.*—This condition or in other words turning of the output shaft 11 at a speed less than that of the input shaft 10 is produced by decreasing the displacement capacity of the adjustable displacement device 25 below that of the fixed displacement device 24 so that the resulting restriction of the fluid flow from the device 25 produces in the hydraulic system a reaction which is exerted on the eccentric ring 62 to produce rotation of the output shaft. Herein, such a reduction in the displacement capacity is achieved by shifting the ring 81 transaxially between the "neutral" and "direct drive" positions n and d above referred to a distance proportional to the desired output speed. As the eccentricity of the ring 81 is reduced from neutral (Fig. 18), the radial displacement of the vanes 82 is decreased and therefore the volume of fluid forced out of the contracting chambers a and drawn into the expanding chambers b of the device 25 during each revolution of the rotor is reduced proportionately. Under this condition, each contracting chamber a of the device 25 is, as in neutral, connected by the valves to an expanding chamber of the device 24 and vice versa.

Assume, for example, that the amount of the transaxial shift of the ring 81 is sufficient to reduce the stroke of the vanes by an amount equal to half of the full stroke of the vanes 61 which is determined by the fixed throw of the eccentric 62. Then, during each revolution of the rotor, only one-half as much oil will be displaced by the device 25 as must be displaced by the device 24 during each revolution of relative rotation between the rotor and the output shaft which carries the eccentric 62. The resulting restriction of the fluid flow out of the contracting chambers of the fixed displacement device 24 creates a reaction on the eccentric 62 and causes the output member 11 to turn. The amount of this turning must be sufficient to produce one revolution of relative rotation between the rotor and the output shaft while the rotor is turning far enough to displace the volume of oil required for a full stroke of the vanes 61. If, as assumed, the displacement capacity of the device 25 is reduced fifty per cent, a corresponding percentage rotation of the output member 11 relative to the rotor must occur so that the output member would turn one-half of a revolution for each revolution of the rotor. The drive ratio would then be 0.5 to 1. Similarly, if the eccentric is adjusted to produce a displacement of the device 25 equal to one-fourth the per revolution displacement of the device 24, the speed ratio would be 0.25 to 1. It will be apparent then that as the position of the ring 82 is shifted from the neutral position n (Fig. 18) toward and into coincidence with the axis of the rotor 12 (Fig. 17), the ratio of motion transmission from the input shaft to the output shaft will increase up to unity progressively.

*Overdrive.*—This condition (Fig. 16) of rotating the output shaft at a speed greater than the drive shaft is achieved by continuing the underdrive adjustment of the eccentric ring 81 above referred to beyond the direct drive position d to a selected position o thereby shifting its eccentric surface off-center with respect to the rotor 12 while at the same time reversing the phase relationship between this ring and the rotor. In effect, the ring 81 is turned through a half revolution relative to its underdrive positions without changing the timing of the motions of the valve 27 by the eccentric 117. Such reversal in the phase relationship results in a reversal of the directions of fluid flow through the valve chambers 112, 113 and 121, 122 as indicated by the arrows in Fig. 16. Under this condition, the contracting chambers a of the adjustable device 25 will be connected by the valves 26 and 27 to the contracting chambers a of the fixed displacement device 24. The device 25 thus acts as a pump to force into the contracting chambers of the device 24 during each revolution a volume of fluid proportional to the overdrive eccentricity of the eccentric ring 81. Therefore, during each revolution of the rotor 12, the output shaft must turn not only through the full revolution required in order to accommodate the displacement of the device 24, but also must turn through an additional angle sufficient to accommodate the high pressure fluid delivered by the device 25. That is to say, for an angular displacement A (Fig. 16) of the rotor, the output shaft must turn through a greater angle C, this being the angle A plus an additional angle corresponding to the prevailing overdrive eccentricity of the eccentric ring 81.

The amount of overdrive of the output shaft 11 corresponds to the amount of fluid being displaced by the device 25 which, in turn, is determined by the prevailing eccentricity of the ring 81. Assume, for example, that this ring is displaced a distance such that the stroke of the vanes 82 will equal 60 per cent of the full stroke of the vanes 61. To accommodate the fluid thus pumped into the chamber 112, the eccentric 62 and therefore the output shaft 11 must overrun the rotor 0.6 of a revolution during each revolution of the rotor. The ratio of motion transmission from the rotor to the output member would then be 1.6 to 1. By shifting the reactor ring 81 back toward the rotor axis, the ratio may be reduced to any desired value down to unity or direct drive.

*Reverse.*—Rotation of the output shaft 11 in a direction reverse to that of the driving rotor is achieved by adjusting the underdrive eccentricity of the reactor ring 81 of the adjustable displacement device 25 beyond the *n* position required to equalize the displacement capacities of the two devices as in neutral. The ring is actually shifted to the *r* position as shown in Fig. 19 thus raising the displacement capacity of the device 25 above that of the device 24 by an amount proportional to such shift.

Under this condition, the contracting chambers *a* of the device 25 would, as in the neutral condition, be connected to the expanding chambers *b* of the device 24 and vice versa. However, instead of an idle transfer of equal volumes of fluid back and forth between the two devices, the increased volume of fluid delivered by the device 25 would be forced through the inner valve space 113 and into the expanding chambers *b* of the device 24 causing expansion thereof at a rate greater than their rate of expansion by the action of the eccentric 62. Such an increasing rate of expansion is possible only by turning of the output shaft 11 in a direction reverse to the rotation of the driving rotor. The amount of such reverse turning is indicated at E (Fig. 19) for a given angle A of the rotor motion and corresponds to the excess of the displacement capacity of the device 25 over the fixed capacity of the device 24.

From the foregoing, it will be observed that during underdrive, the fixed displacement device 24 acts as a pump and endeavors to force fluid into the high pressure chamber 122 at a restricted rate per revolution metered by the adjustable device 25. Then, the flow of high pressure fluid is from the device 24 to the device 25 through the chambers 122 and 112. The action of the two displacement devices is reversed during overdrive, the adjustable device 25 then acting as a pump to force fluid to the fixed displacement device 24, the direction of the flow of high pressure fluid being reversed as indicated by the solid arrows in Fig. 16. In each case, the outer valve chamber 122 is the high pressure side of the hydraulic coupling, the inner chamber 121 merely serving to transfer fluid at low pressure into the expanding chambers *b* of the two devices.

In reverse, the phase relationship of the displacement devices and the associated valves is the same as in underdrive, but the capacity of the adjustable device 25 is greater than that of the fixed capacity device 24. In this case, the pressures in the valve spaces 112, 122 and 113, 121 are reversed as compared to underdrive and overdrive.

The actuator ring 81 of the displacement device 25 may be moved selectively to the various positions above referred to by controlling the admission of pressure fluid to the servo cylinder 105, (Fig. 26) either manually or automatically as will be described later, through ports 173, 174, and 175. The port 173 enters the cylinder at the rod end thereof which constitutes a stop for arresting the piston movement in the maximum overdrive position. Movement of the piston in the opposite direction is normally limited at the neutral position as determined by a stop 176 which is retractible to permit the piston to move on to the "reverse" position.

The stop 176 is formed on an auxiliary piston 177 slidable in an enlarged portion 179 of the cylinder 105 and moved to the normal position shown in Fig. 26 by pressure fluid admitted through a passage 178. In this position of the stop, fluid may be admitted through the port 175 to the head of the piston through a passage to move the piston toward the overdrive position.

While with the aid of means such as the stop 176, the transmission may be set in "neutral" and thus disabled readily under most conditions, it is also desirable to disable the transmission automatically at other times while the prime mover is idling below a predetermined speed. This is accomplished in accordance with the present invention by the action of a valve 180 (Figs. 7 and 8) which is responsive to the speed of the rotor 12 and at normal operating speeds maintains the fluid transfer connections above referred to between the displacement devices 24 and 25 but which establishes direct communication between the high and low pressure chambers of the two devices when the speed of the input shaft falls below a predetermined value, preferably a normal idling speed in the case of the prime mover of an ordinary automotive vehicle. Herein, the valve is built into the rotor 12 and actuated by a speed sensing device such as a flyweight. The latter comprises a plunger 181 having heads 182 slidable in a hole 183 extending radially through the rotor plate 32 and intersecting both of the holes 129 and 130 which connect the inner and outer valve chambers 113, 121 and 112, 122. The spacing of the heads is slightly greater than the radial spacing of the holes so that when the plunger is in its innermost position against a stop 184, both holes will be uncovered as shown in Fig. 8 and connected together through the bore 183.

A spring 185 acting in compression between the outer end of the plunger 181 and a stop 186 on the rotor periphery urges the plunger inwardly and is stressed to hold the plunger against the stop 184 at speeds below a predetermined value somewhat above the ordinary idling speed which, in the case of most automotive vehicles is about 450 R. P. M. At higher rotor speeds, the centrifugal force developed by the plunger acting as a flyweight is sufficient to overcome and compress the spring allowing the plunger to move outwardly so that the inner head 182 covers the inner holes 130 as shown in Fig. 7 thus interrupting the connection between the valve chambers. The transmission is thus conditioned for normal operation. As the rotor speed decreases and falls below the predetermined idling speed, the valve interconnects the chambers 121 and 122 (Fig. 8) thus disabling the transmission and preventing the transmission of rotary power therethrough even though the adjusting lever 103 may not be positioned to accurately equalize the displacement capacities of the two devices 24 and 25 as in the "neutral" condition described above. Similar disabling action takes place when the adjustable eccentric has been shifted to "reverse" position and while the engine is idling preparatory to reverse operation of the vehicle.

The infinitely variable ratio transmission above described is well suited for use in varying the drive ratio automatically in response to the varying conditions encountered in the operation of an automotive vehicle. Figs. 20 to 26 illustrate such an automatic control which in general operates independently of the engine throttle to so adjust the servo 104 that the highest possible or most favorable drive ratio consistent with the prevailing load on the engine is maintained. That is to say, substantial speeding up of the engine under the ordinary throttle control is prevented except when the transmission is adjusted for a high ratio, preferably overdrive.

The term "drive ratio" as used herein as in the automotive art refers to the ratio of the motion of the driven or output shaft 11 relative to that of the drive or input shaft. Thus, direct and overdrive above referred to are high drive ratios whereas settings of the adjusting arm 103 near "neutral" produce low ratios corresponding to "low gear" in an ordinary automotive transmission.

The desirable automatic ratio adjusting action above referred to is achieved by varying the direction and extent of movement of the adjusting lever 103 in accordance with a combination of two conditions, one the speed of the engine or the drive shaft 10 and the other the load on the output shaft 11 or in other words the torque required to propel the vehicle forwardly. In the present instance, these two conditions operate in conjunction with a follow-up mechanism to position the parts of a valve 188 (Figs. 22 and 26) by which pressure fluid is directed selectively to opposite ends of the servo cylinder 105 through a valve 189 (Figs. 26 and 27) which is operable manually to disable the automatic control when it is desired to reverse the drive through the transmission.

The reverse valve 189 comprises a cylinder 190 formed in the servo casting 106 and having longitudinally spaced ports 191 to 194 respectively connected as shown in Fig. 26 to the ports 173, 174, 175, and 178 of the servo cylinder 105 and coacting with lands on a plunger 195 which is shiftable manually between the normal or forward drive position shown in Fig. 26 and the reverse drive position (Fig. 27). The valve plunger may be moved by shifting a rod 196 extending outwardly through the housing 14 (see Figs. 24 and 25) to a point of control accessible to the vehicle driver.

In the normal position of the plunger, the outlet of the make-up pump 131 is connected through a port 197 and the port 194 to the cylinder 179 beneath the stop piston 177 which is thus held in the position for arresting the ratio decreasing movement of the piston 107 at the neutral position. At this time, pressure fluid supplied through a passage may be delivered through the port 193 to the lower or head end of the piston through the port 175 from which fluid may enter the cylinder below the piston 107 when the latter is in its neutral position against the stop 176, or fluid delivered through a passage 199 will flow to the rod end of the cylinder through the port 173.

When the valve plunger 195 is shifted from the normal forward drive position (Fig. 26) to the "reverse" position (Fig. 27), the fluid supply port 197 is isolated by a land 200 and pressure beneath the stop piston 177 is released by uncovering of the port 194. At the same time, the ports 191 and 193 are covered by the lands on the plunger thereby preventing entry of pressure fluid to the upper and lower ends of the servo cylinder 105. The cylinder port 174 is at this time connected to the passage 198 through the port 192 so that pressure fluid may be supplied to the rod end of the piston if the servo piston is in its neutral position and thus disposed below the port 174. If the piston is in a higher ratio position, it will cover the port 174 and movement of the adjustable eccentric 81 to the "reverse" position will be prevented until the speed of the drive shaft has been reduced to an idling value as will be described later.

Referring now to Figs. 22, 23, and 26, the combined speed and torque responsive valve 188 includes a ported sleeve 201 slidable in a cylinder 202 formed in an extension of the servo casting 133 in axial alinement with the pump drive shaft 134. Slidable in the sleeve 201 is a plunger 203 having lands 204 and 205 spaced apart to cover holes 206 and 207 which extend through the sleeve into grooves registering continuously with annular ports 208, 209, and 210 axially spaced along the cylinder 202. The intermediate port 209 is connected by a passage 211 to a source of pressure fluid, the outlet of the make-up pump 131 in this instance. The other ports 208 and 210 are connected respectively to the passages 199 and 198 above described leading to the reverse valve 189 (Fig. 26).

A light compression spring 187 acts against an abutment at one end of the valve sleeve 201 to urge the latter continuously toward a lever 212 whose forked end bears against the other end of the sleeve and operates to move the latter in unison with changes in the position of the ratio adjusting servo 104 whereby to produce a follow-up action. The lever is fulcrumed intermediate its ends on a pin 213 adjustably mounted on the servo housing 133 and at its other end is pivotally connected to one end of a rod 214 disposed perpendicular to the servo piston rod 108 and guided at its other end in the servo casting. The latter rod end 215 bears against and constitutes the follower of a cam surface 216 formed on the piston rod and sloping at an angle corresponding to the follow-up motion to be imparted to the valve sleeve.

The device for sensing changes in the speed of the drive shaft 10 is in the present instance a governor comprising angularly spaced flyweights 217 pivoted on tangentially disposed pins mounted on the pump drive gear 137 which constitutes the governor ball head and rotates in unison with the rotor 12. The flyweights are in the form of bell cranks with the weighted ends projecting through holes in the gear 137 and along the drive sleeve 134 so as to move outwardly by centrifugal action as the speed increases. The toes 218 of the flyweights project inwardly toward the governor axis and have shaped surfaces 219 which bear against the coned outer edge portion or the inner flat potrion of a disk 220 fast on a rod 222 projecting slidably through the drive sleeve and bearing at its inner end against a lubricated seat 223 in one end of the valve plunger 203. Thus the force tending to move the valve plunger to the right as viewed in Fig. 22 increases as the drive shaft speed increases and decreases as the speed decreases.

The flyweight surfaces 219 are specially shaped to change the leverage ratio of the flyweights automatically at different speeds so as to render the governor substantially as sensitive to speed variations in the lower ranges as at high speed. At low speeds when the weights are disposed close to the drive shaft as shown in Fig. 22, the outer edge of the disk 220 engages the flyweights near their pivots. As the speed increases and the flyweights move outwardly, the point of contact between the disk and surfaces 219 shifts inwardly progressively, reaching the flat portion of the disk at high speeds as shown in Fig. 23. At this time, when the centrifugal force is at maximum, the leverage of the flyweight force is at a minimum.

The force of the flyweights acting on the rod 222 is opposed by a spring 224 disposed beyond the other end of the valve 188 and acting between an adjustable plug 225 threaded therein and a collar 226 fixed to a rod 227 which bears at its inner end against the valve plunger 203. The spring 224 is stiff enough to hold the flyweights 217 inwardly as shown in Fig. 22 when the drive shaft is turning at idling speed for example below 600 R. P. M. The rod 227 is also connected to the valve sleeve 201 through compression springs 228 which act between the collar 226 and abutments on the interior of the sleeve and exert a two way damping effect on the valve plunger.

A force is also applied to the valve rod 227 which acts on the valve plunger 203 in opposition to the force of the flyweights 217 and is at all times proportional to the load on the output shaft 11 of the transmission, or in other words to the torque being transmitted through the fluid coupling to accelerate the vehicle. Since the transmission is of the fluid differential type, the highest pressure prevailing therein is an accurate measure of the existing load on the output member. This pressure is therefore utilized as the load proportional signal and through the medium of the piston 229 is converted into a corresponding force applied to the valve 188 in opposition to the speed responsive force. To this end, the piston 229 is on the outer end of the rod 227 and slides in a cylinder 230 formed in the plug 225 and receiving pressure fluid through a passage 231 (Fig. 22) which leads through a hole 232 in the valve and servo casings 133 to transfer the ring 233 (Figs. 1 and 20) which encircles the output shaft 11 within the bearing 54. The transfer ring communicates with a counterbore 234 into which is pressed one end of a tube 235 which extends axially through the tube 142 and the output shaft 11 and at its other end has a running fit in the axial bore 157 which as described above is formed in the rotor part 43 and registers at its outer end with the groove 156 of the transfer valve 150. As described above, this groove is always connected to the one of the valve chambers 121 and 122 which is at the higher pressure. In the normal position of the valve plunger 145, the connection is through the passage 155 to the outer valve chamber 122 as shown in Fig. 20. By virtue of these connections, the pressure developed within the transmission when the latter is operative as determined by the speed responsive valve 180 will be transmitted to the cylinder 230.

To enable the transmission to pass relatively quickly through the extremely low drive ratios as the engine is speeded up, the torque responsive device including the piston 229 is partially disabled at engine speeds below 600 R. P. M. for example at which a drive ratio of about 1 to 3 is attained. For this purpose, a by-passage 236 is extended around the piston 229 from a port 237 when the piston is positioned by the governor as shown in Fig. 22. The fluid pressure thus developed in the transmission is also applied to the rod end of the piston thus reducing the resultant effective area on which the pressure acts. As the engine speeds up and attains the proper value predetermined by the axial adjustment of the plug 225, the piston will cover the port 237 about the time that a smaller piston 239 on the rod 227 passes out of a bore 240 permitting the pressure in the by-passage 236 to be dissipated along the bore. The full area of the outer end of the piston 229 is thus restored.

Of course, the piston 229 is sized properly in relation to the available pressures, and the governor is designed to correlate properly to forces applied to the valve plunger 203. Similarly, the follow-up motion mechanism including the cam surface 216 is correlated with the characteristics of the governor and the torque responsive device so as to produce the desired operating characteristics under various conditions encountered in service.

The operation of the automatic control by the joint action of the speed and torque sensing devices and the follow-up mechanism is as follows, assuming that the engine is idling at low speed, the servo piston 107 then being positioned in neutral against the stop 176 and with the parts of the governor and valve 188 disposed as shown in Fig. 22. At this time, the fluid coupling would be disabled by fluid connection between the valve chambers 121 and 122 through the speed responsive valve 180 as shown in Fig. 13. Now, when it is desired to propel the vehicle forwardly, the accelerator is depressed to speed up the engine whereupon the centrifugal valve 180 closes rendering the transmission operative. The speed increase is detected by the governor and the resulting increase in force on the valve plunger 203 moves the latter a corresponding distance to the right against the action of the speeder spring 224 and the pressure on the small differential area of the piston 229. This results in uncovering the sleeve port 207 permitting pressure fluid from the passage 211 to flow in through a hole 241 in the sleeve 201 and out through the passage 198 and the valve 189 and into the bottom of the servo cylinder 195 through the port 175.

The increased pressure on the servo piston moves the latter upwardly as viewed in Fig. 26 thus shifting the reactor ring 61 of the displacement device 25 inwardly to reduce its throw and correspondingly decrease the displacement capacity. Torque is thus exerted on the output shaft 11 at a low drive ratio which, by the action of the follow-up mechanism, is proportioned in accordance with the speed of the drive shaft. That is to say, as the servo piston moves away from neutral into the underdrive range, the inclined surface 216 on the piston rod cams the rod 214 inwardly and this movement is transmitted through the lever 212 to the valve sleeve 201 allowing the latter to move to the right under the action of the spring 187. The ratio increasing movement of the servo piston continues until the follow-up movement of the valve sleeve is sufficient to bring the port 207 opposite the plunger land 205 and thus interrupt the fluid flow to the servo.

When the fluid transmission is thus rendered operative to initiate the application of driving torque to the output shaft, the pressure which builds up in the valve chamber 122 is transmitted through the passages 157, 235, and 233 (Fig. 20) to the cylinder 230 and thus exerted on the piston 229 whose effective area at this time is reduced through the action of the by-pass 236. The force which, for the reasons set forth above, is proportional to the torque being applied to accelerate the output member, supplements the force of the spring 224 in opposing the flyweight or speed responsive force, so that the equilibrium position of the valve plunger 203 for a given engine speed and load on the output shaft is determined by the resultant of the three forces derived from the spring 224, the load, and driving speed.

As the engine speed increases above a predetermined value, for example about 600 R. P. M., the full area of the piston 229 will become effective by covering of the by-pass port 237 and so remain effective at high underdrive and overdrive ratios.

Now, if while the speed of the engine remains constant at a normal underdrive ratio, the load on the output shaft 11 increases, the pressure developed in the valve chamber 122 of the transmission will increase proportionately. This increases the force exerted by the piston 229 on the valve plunger 203 thus moving the latter to the left relative to the sleeve 201 and against the prevailing force of the flyweights. The port 206 is thus at least partially uncovered by the plunger land 204 and pressure fluid is permitted to flow outwardly through the passage 199 into the rod end of the servo cylinder 105 through the port 173. The servo piston 107 is thus moved downwardly so as to adjust the eccentric 81, increase the displacement capacity of the device 25, and thereby decrease the drive ratio of the transmission. More torque is thus applied to accelerate the output shaft. The ratio reducing motion of the servo piston 107 is of course transmitted back through the linkage 212 and 214 to move the valve sleeve 201 to the left until the port 206 has again become centered relative to the plunger land 204.

It will thus be seen that with the combined speed and load responsive control, speeding up of the drive shaft 10 results in an increase in the drive ratio of the transmission while an increase in load on the output shaft is reflected in a decrease in the drive ratio. With the speed and load controls acting jointly on the control valve 188, an increase in the drive ratio due to an increase in engine speed will be accompanied by an increase in torque and therefore pressure within the transmission. This immediately reacts through the valve 188 to oppose the speed responsive force and thus produce a decrease in the drive ratio. The result is to establish the highest possible drive ratio by which the prevailing load on the output shaft may be maintained or accelerated. Speeding up of the engine at too rapid a rate is thus prevented and the available engine power is always used most efficiently and economically in overcoming the existing load.

To reverse the rotation of the output shaft 11, the reverse valve 189 is shifted to the left from the position shown in Fig. 26 and moved to the other limit position (Fig. 27) when the engine is idling so that the servo piston 107 is in neutral position against the stop 176. The pressure behind the stop is released as above described and a path is established through the ports 192 and 198 for the flow of pressure fluid into the rod end of the servo cylinder through the port 175 which is then uncovered by the piston 107. Now, as the engine is speeded up to close the speed responsive valve 180 and render the transmission operative, the governor controlled valve 188 will operate as before to admit pressure fluid to the rod end of the servo cylinder through the port 174 and the servo piston will thus be moved to the reverse position in which the displacement capacity of the device 25 is increased above that of the fixed displacement device 24 to produce reverse rotation of the output member at the ratio corresponding to the difference in the two displacement capacities.

If the reversing valve is shifted to the reverse position when the servo piston 107 is out of the neutral position, the inlet port 174 will be blocked by the piston and no fluid can be admitted to the servo cylinder to move the piston to the reverse position. This avoids the possibility of the transmission being thrown in reverse unintentionally when torque is being transmitted to the output shaft 11 in the forward direction.

I claim as my invention:

1. A fluid transmission having, in combination, a hollow driving rotor having axially spaced annular grooves concentric with the rotor axis and extending around the inner periphery of the rotor, radial slots angularly spaced around said rotor and intersecting said grooves, said rotor including a plurality of plates arranged face to face in abutting relation, fixed and variable throw eccentric rings slidably fitting between the walls of the respective grooves at the inner edges thereof, vanes slidable in said slots and dividing each of said grooves into a plurality of chambers, the inner ends of each vane being urged against the outer periphery of the ring therein whereby each chamber expands and contracts alternately in each revolution of the rotor, two valve mechanisms mounted in said rotor between said grooves and coacting to control the transfer of fluid back and forth between the two groups of chambers, means for operating the respective valve mechanisms in synchronism with the operation of the vanes of the respective sets, and angularly spaced bolts extending through said rotor plates externally of said grooves and valve mechanisms and clamping the plates rigidly together, one end of said bolts projecting from said rotor to form a drive coupling element.

2. A fluid transmission having, in combination, a hollow driving rotor having two sets of fluid displacement chambers angularly spaced around opposite ends of the rotor, fixed and variable throw eccentrics associated with the respective sets of chambers within the rotor and operable during rotation of the rotor to alternately expand and contract each of the associated chambers, valves operable in timed relation to the turning of said rotor and controlling the transfer of fluid between the chambers of said sets, a nonrotatable sleeve projecting axially into one end of said rotor, an angularly adjustable member disposed within said sleeve and projecting from the outer end thereof, and means connecting said member to said variable throw eccentric to shift the latter transaxially and along a diametrical line in response to angular adjustment of said member.

3. A fluid transmission having, in combination, a driving rotor having axially spaced annular grooves concentric with the rotor axis, radial slots angularly spaced around said rotor and intersecting said grooves, fixed and variable throw eccentric rings slidably fitting between the walls of the respective grooves, vanes slidable in said slots and dividing each of said grooves into a plurality of chambers, one end of each vane being urged against the periphery of the ring therein and having an effective area smaller than the other end of the vane, recesses in said rotor enclosing said larger vane ends, two valve mechanisms mounted in said rotor between said grooves and coacting to control the transfer of fluid back and forth between the two groups of chambers, each of said valves comprising two chambers in said rotor separated by a member operated in synchronism with the operation of one set of said vanes, a device automatically responsive to pressure changes in said valve chambers, and valve means actuated by said device to connect said vane recesses to the one of said valve chambers which is at the higher pressure.

4. A fluid transmission having, in combination, a hollow driving rotor having two sets of fluid displacement chambers angularly spaced around opposite ends of the rotor, fixed and variable throw eccentrics associated with the respective sets of chambers within the rotor and operable during rotation of the rotor to alternately expand and contract each of the associated chambers, valves operable in timed relation to the turning of said rotor and controlling the transfer of fluid between the chambers of said sets, said valves including separated recesses each subjected to high pressure at certain times and at a lower pressure at other times, a pump driven by said rotor and delivering fluid at a desired make-up pressure, and a valve responsive automatically to pressure changes in said valve recesses and operable to connect the outlet of said pump to the one of the recesses which is at the lower pressure.

5. A fluid transmission having, in combination, a driving rotor, a driven member rotatable about the axis of said rotor, a fluid displacement device carried by said rotor and actuated by relative rotation between said rotor and driving member to displace fluid in response to such rotation, a second fluid displacement device carried by said rotor and actuated by rotation thereof, said second device having an adjustable reactor member, means supporting said reactor member for adjustment to vary the displacement capacity of the second device, two fluid filled passages in said rotor for transferring fluid simultaneously in opposite directions between said devices, valve mechanism actuated in timed relation to the rotation of said rotor to control the direction of transfer of fluid through the respective passages, a centrifugal element for rotation in unison with said rotor, a by-passage connecting said passages including a valve actuated by said element to open said by-passage when the speed of said rotor falls below a predetermined value and closes the by-passage at higher speeds.

6. A fluid transmission having, in combination, a driving rotor, a driven member rotatable about the axis of said rotor, a fluid displacement device carried by said rotor and actuated to displace fluid in accordance with the relative rotation between said rotor and driven member, a second fluid displacement device carried by said rotor and actuated in accordance with the rotation of the rotor, a nonrotatable reactor member selectively adjustable to vary the displacement capacity of said second device between zero and a value equal to the capacity of said first device, means providing fluid passages interconnecting said devices, a speed detector responsive to rotation of said rotor and operable to detect a fall in the speed of the rotor below a predetermined value, and means including a valve actuated by said detector and operable to connect the inlet and outlet of each of said devices when the rotor speed is below said value.

7. A fluid transmission having, in combination, a driving member, a driven member rotatable about the axis of said driving member, a fluid displacement device carried by said driving member and actuated to displace fluid in accordance with the relative rotation between said members, a second fluid displacement device carried by said driving member and actuated in accordance with the rotation thereof, a reactor selectively adjustable to vary the displacement capacity of said second device, a speed detector responsive to changes in the speed of one of said members and operable to adjust the position of said reactor correspondingly, means providing fluid passages interconnecting said devices, a speed detector responsive to rotation of said driving member and operable to detect a fall in the speed of the member below a predetermined value, and means including a valve actuated by said detector and operable to connect the inlet and outlet of each of said devices when the driving member speed is below said value.

8. In a fluid transmission, the combination of, a rotary driving rotor, fixed and variable capacity fluid displacement devices carried by the rotor, valves operable in timed relation to the turning of said rotor and controlling the transfer of fluid between said devices, a member selectively adjustable from the exterior of said rotor to increase or decrease the capacity of said variable capacity device, a hydraulic actuator including a piston connected to said adjusting member, a second piston forming a stop for said first piston limiting the capacity increasing adjustment of said member to a position in which the per revolution displacement of said variable capacity device is substantially equal to the fixed capacity of said other device, said second piston being retractable to permit said first piston to move and further increase the capacity of the variable capacity device, and manually operable means for controlling the application of pressure to said second piston.

9. In a fluid transmission, the combination of, a rotary driving rotor, fixed and variable capacity fluid displacement devices carried by the rotor, valves operable in timed relation to the turning of said rotor and controlling the transfer of fluid between said devices, a member selectively adjustable from the exterior of said rotor to increase or decrease the capacity of said variable capacity device, a movable stop engageable with said member and normally operable to limit the capacity-increasing movement of the member to a position in which the capacities of said devices are substantially equalized, and means normally holding said stop in said limit position but releasable to permit retraction of the stop to further increase the displacement capacity of said variable capacity device.

10. In a fluid transmission, the combination of, a rotary driving rotor, fixed and variable capacity fluid displacement devices carried by the rotor, valves operable in timed relation to the turning of said rotor and controlling the transfer of fluid between said devices, a member selectively adjustable from the exterior of said rotor to increase or decrease the capacity of said variable capacity device, a reversible power actuator selectively operable to move said member varying distances back and forth, a stop normally positioned to limit the capacity-increasing movement of said member by said actuator to a position in which the capacities of said devices are substantially equalized, and means normally holding said stop in said limiting position but releasable to permit retraction of the stop and further capacity-increasing movement of said member.

11. In a fluid transmission, the combination of, a rotary driving rotor, fixed and variable capacity fluid displacement devices carried by the rotor, valves operable in timed relation to the turning of said rotor and controlling the transfer of fluid between said devices, a member selectively adjustable from the exterior of said rotor to increase or decrease the capacity of said variable capacity device, a reversible power actuator selectively operable to move said member varying distances back and forth, a stop normally positioned to limit the capacity-increasing movement of said member by said actuator to a position in which the capacities of said devices are substantially equalized, and means operable automatically to disable said actuator from moving said member after releasing said stop until said member is in said limit position.

12. In a power transmitting mechanism, the combination of, rotary driving and driven elements, a transmission of the fluid differential type coupling said elements for the transmission of rotary power therebetween at variable ratios, said transmission having a fluid filled chamber in which the fluid pressure therein varies in proportion to the torque exerted on said driven element, a member movable back and forth in opposite directions to correspondingly increase and decrease the ratio of said transmission, a servo for adjusting said member selectively, a device controlling the energization of said servo, means for detecting changes in the speed of said driving element and acting on said device to cause said servo to increase and decrease the drive ratio of said transmission as the speed of the driving element respectively increases and decreases, and means responsive to pressure changes in said chamber and actuating said device to cause said servo to increase and decrease said drive ratio as said pressure decreases and increases respectively, and a follow-up mechanism actuating said device in accordance with the movements of said adjusting member whereby to proportion the motion of said servo in accordance with the magnitudes of said speed and pressure changes.

13. In a power transmitting mechanism, the combination of, rotary driving and driven elements, a transmission of the fluid differential type coupling said elements for the transmission of rotary power therebetween at variable ratios, said transmission having a fluid filled chamber in which the fluid pressure therein varies in proportion to the torque exerted on said driven element, a member movable back and forth in opposite directions to correspondingly increase and decrease the ratio of said transmission, a device for sensing changes in the speed of said driving element, a device responsive to changes in the pressure in said chamber, and mechanism controlled by the joint action of said two devices and operable to vary the position of said adjusting member in accordance with a resultant of the changes in said speed and torque.

14. In a power transmitting mechanism, the combination of, rotary driving and driven elements, a transmission of the fluid differential type coupling said elements for the transmission of rotary power therebetween at variable ratios, said transmission having a fluid filled chamber in which the fluid pressure therein varies in proportion to the torque exerted on said driven element, a member movable back and forth in opposite directions to correspondingly increase and decrease the ratio of said transmission, a servo for adjusting said member selectively, a device controlling the energization of said servo and including two individually movable parts, means for moving one of said parts back and forth in unison with the movements of said adjusting member, means responsive to changes in the speed of said driving element and operable to exert on the second of said parts a force which increases with the speed of said driving element, and means for transmitting the pressure in said chamber to said second part in opposition to said first mentioned force.

15. In a power transmitting mechanism, the combination of, rotary driving and driven elements, a transmission of the fluid differential type coupling said elements for the transmission of rotary power therebetween at variable ratios, said transmission having a fluid filled chamber in which the fluid pressure therein varies in proportion to the torque exerted on said driven element, a member movable back and forth in opposite directions to correspondingly increase and decrease the ratio of said transmission, and mechanism responsive jointly to changes in the speed of said driving element and in the pressure in said chamber to produce a resultant proportionate change in the position of said adjusting member.

16. The combination of, rotary driving and driven elements, a transmission coupling said elements together and having a member selectively movable back and forth to progressively and correspondingly vary the ratio at which the driving motion is transmitted to said driven element, a reversible power actuator for operating said member, a device controlling the energization of said actuator to determine the direction and extent of movement of said member, mechanism responsive to changes in the speed of said driving element to exert on said device a force which varies with the speed changes, and mechanism responsive to changes in the torque exerted on said driven member by said transmission to exert on said device a force which acts in opposition to said first mentioned force and which increases and decreases with said torque.

17. A fluid transmission having, in combination, a hollow driving rotor having two sets of fluid displacement chambers angularly spaced around opposite ends of the rotor, fixed and variable throw eccentrics associated with the respective sets of chambers within the rotor and operable during rotation of the rotor to alternately expand and contract each of the associated chambers, valves operable in timed relation to the turning of said rotor and controlling the transfer of fluid between the chambers of said sets, a nonrotatable element projecting axially into one end of said rotor and supporting said variable throw eccentric for transaxial adjustment along a diameter of said rotor to vary the throw thereof, an angularly adjustable member extending along said element and projecting from the outer end thereof, an eccentric fixed to the inner end portion of said element, and a follower for said last mentioned eccentric for actuating one of said valves.

References Cited in the file of this patent

UNITED STATES PATENTS

| Number | Name | Date |
|---|---|---|
| 1,244,878 | Manly | Oct. 30, 1917 |
| 1,259,090 | Ferris | Mar. 12, 1918 |
| 1,308,436 | Maw | July 1, 1919 |
| 1,354,592 | Bair | Oct. 5, 1920 |
| 1,552,023 | Wingquist | Sept. 1, 1925 |
| 1,603,437 | Wingquist | Oct. 19, 1926 |
| 1,816,735 | Magness | July 28, 1931 |
| 1,914,622 | Smith | June 20, 1933 |
| 1,952,570 | Smith et al. | Mar. 27, 1934 |
| 1,998,922 | Chamberlain | Apr. 23, 1935 |
| 2,072,356 | Braly | Mar. 2, 1937 |
| 2,112,844 | Howard | Apr. 5, 1938 |
| 2,199,081 | Perin | Apr. 30, 1940 |
| 2,284,852 | Tyler | June 2, 1942 |
| 2,437,139 | Tucker | Mar. 2, 1948 |
| 2,447,348 | Kucher | Aug. 17, 1948 |